US011576227B2

(12) United States Patent
Back et al.

(10) Patent No.: US 11,576,227 B2
(45) Date of Patent: Feb. 7, 2023

(54) METHOD FOR TRANSMITTING SIDELINK SIGNAL IN WIRELESS COMMUNICATION SYSTEM

(71) Applicant: LG Electronics Inc., Seoul (KR)

(72) Inventors: Seoyoung Back, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/716,386

(22) Filed: Apr. 8, 2022

(65) Prior Publication Data

US 2022/0232667 A1 Jul. 21, 2022

Related U.S. Application Data

(63) Continuation of application No. PCT/KR2020/013851, filed on Oct. 12, 2020.

(30) Foreign Application Priority Data

Oct. 11, 2019 (KR) ........................ 10-2019-0125813
Oct. 11, 2019 (KR) ........................ 10-2019-0125842

(51) Int. Cl.
*H04W 76/28* (2018.01)
*H04W 8/00* (2009.01)
(Continued)

(52) U.S. Cl.
CPC .................................. *H04W 76/28* (2018.02)

(58) Field of Classification Search
CPC . H04W 76/28; H04W 8/005; H04W 52/0216; H04W 4/40; H04W 92/18; H04W 72/0453; Y02D 30/70
(Continued)

(56) References Cited

U.S. PATENT DOCUMENTS

2018/0063858 A1* 3/2018 Au ........................ H04L 5/0053
2018/0063865 A1* 3/2018 Islam ................ H04W 72/1289
(Continued)

FOREIGN PATENT DOCUMENTS

CN 106161813 A * 11/2016 ......... H04L 41/0846
KR 20190111767 10/2019
(Continued)

OTHER PUBLICATIONS

International Search Report and Written Opinion in International Appln. No. PCT/KR2020/013851, dated Jan. 26, 2021, 9 pages (with English translation).
(Continued)

*Primary Examiner* — Inder P Mehra
(74) *Attorney, Agent, or Firm* — Fish & Richardson P.C.

(57) ABSTRACT

According to an aspect of the present disclosure, a method performed by a user equipment in a wireless communication system: receives discontinuous reception (DRX) configuration information for each of a plurality of bandwidth parts (BWPs), wherein the DRX configuration information includes a first on duration associated with a DRX operation; and on the basis of the DRX configuration information, transmits a discovery signal during the first on duration on an activated BWP from among the plurality of BWPs, wherein the DRX configuration information is configured for each of the plurality of BWPs.

14 Claims, 28 Drawing Sheets

UE

Receive DRX configuration information for plurality of BWPs — S1201

Transmit discovery message during ON Duration on activated BWP based on DRX configuration information — S1203

(51) Int. Cl.
*H04W 4/40* (2018.01)
*H04W 92/18* (2009.01)
*H04W 72/04* (2009.01)
*H04W 52/00* (2009.01)

(58) Field of Classification Search
USPC .......................................................... 370/311
See application file for complete search history.

(56) References Cited

U.S. PATENT DOCUMENTS

| | | | | |
|---|---|---|---|---|
| 2019/0158229 | A1 | 5/2019 | Wei et al. | |
| 2019/0215897 | A1 | 7/2019 | Babaei et al. | |
| 2019/0281127 | A1* | 9/2019 | Schmidt | H04W 88/04 |
| 2020/0053825 | A1* | 2/2020 | Hwang | H04W 76/28 |
| 2021/0014791 | A1* | 1/2021 | Freda | H04W 52/0229 |
| 2021/0227409 | A1* | 7/2021 | Siomina | H04B 7/0617 |

FOREIGN PATENT DOCUMENTS

| | | | | |
|---|---|---|---|---|
| WO | WO-2018016882 | A1 * | 1/2018 | H04W 28/0284 |
| WO | WO2019033017 | | 2/2019 | |
| WO | WO-2019063336 | A1 * | 4/2019 | H04W 28/0268 |

OTHER PUBLICATIONS

LG Electronics Inc., “Consideration on UE assistance information,” R2-1913139, Presented at 3GPP TSG-RAN2#107bis, Chongqing, China, Oct. 14-18, 2019, 3 pages.

Oppo, “UE assistance information for power saving,” R2-1912093, Presented at 3GPP TSG-RAN WG2 Meeting #107bis, Chongqing, China, Oct. 14-18, 2019, 3 pages.

Extended European Search Report in European Appln. No. 20874635.4, dated Oct. 17, 2022, 9 pages.

* cited by examiner (a)

(b)

(a)

(b)

(a)

(b)

Maximum Period

RX UE1 DRX pattern

RX UE2 DRX pattern

RX UE5 DRX pattern 0 0 0 1 1 0 1 1 0 0 0 0 0 1 2 1 0 0 0 0 0 2 2 0 1 1 0 0

Temp COMMON DRX PATTERN

METHOD FOR TRANSMITTING SIDELINK SIGNAL IN WIRELESS COMMUNICATION SYSTEM

CROSS-REFERENCE TO RELATED APPLICATIONS

Pursuant to 35 U.S.C. § 119(e), this application is a continuation of International Application PCT/KR2020/013851, with an international filing date of Oct. 12, 2020, which claims the benefit of Korean Patent Application No. 10-2019-0125813, filed on Oct. 11, 2019 and Korean Patent Application No. 10-2019-0125842, filed on Oct. 11, 2019, the contents of which are hereby incorporated by reference herein in their entirety.

TECHNICAL FIELD

The present disclosure relates to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

Various embodiments of the present disclosure may provide a method of transmitting and receiving a signal in a wireless communication system and an apparatus for supporting the method.

In detail, various embodiments of the present disclosure may provide a method of operating a service specific low-power M-Bandwidth part (BWP) in a wireless communication system and an apparatus for supporting the method.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various embodiments of the present disclosure may provide a method of transmitting and receiving a signal in a wireless communication system and an apparatus for supporting the same.

According to an aspect of the present disclosure, a method of a user equipment (UE) in a wireless communication system includes receiving discontinuous reception (DRX) configuration information for each of a plurality of bandwidth parts (BWPs), the DRX configuration information including a first ON duration related to a DRX operation, and transmitting a discovery signal during the first ON duration on an activated BWP among the plurality of BWPs based on the DRX configuration information, wherein the DRX configuration information is configured for each of the plurality of BWPs.

The DRX configuration information may further include a DRX period related to the DRX operation and an offset in which the first ON duration in the DRX period starts.

The method may further include transmitting a sidelink signal on a common on-duration that is commonly configured to the plurality of BWPs, wherein the sidelink signal may include the DRX configuration information.

The common on-duration may be configured based on a system frame number (SFN).

The method may further include receiving DRX configuration information of at least one another UE on the common on-duration, and configuring a DRX pattern based on the DRX configuration information of the at least one another UE, wherein the DRX pattern may include a plurality of ON durations.

The plurality of ON durations may include only an ON duration in which the first ON duration and a second ON duration included in the DRX configuration information of the at least one another UE overlap the most.

According to another aspect of the present disclosure, an apparatus for a user equipment (UE) in a wireless communication system includes at least one processor, and at least one memory operatively connected to the at least one processor and configured to store at least one instructions for causing the at least one processor to perform operations, the operations including receiving discontinuous reception (DRX) configuration information for each of a plurality of bandwidth parts (BWPs), the DRX configuration information including a first ON duration related to a DRX operation, and transmitting a discovery signal during the first ON duration on an activated BWP among the plurality of BWPs based on the DRX configuration information, wherein the DRX configuration information is configured for each of the plurality of BWPs.

The DRX configuration information may further include a DRX period related to the DRX operation and an offset in which the first ON duration in the DRX period starts.

The operations may further include transmitting a sidelink signal on a common on-duration that is commonly configured to the plurality of BWPs, and the sidelink signal may include the DRX configuration information.

The operations may further include receiving DRX configuration information of at least one another UE on the common on-duration, and configuring a DRX pattern based on the DRX configuration information of the at least one another UE, and the DRX pattern may include a plurality of ON durations.

The plurality of ON durations may include only an ON duration in which the first ON duration and a second ON duration included in the DRX configuration information of the at least one another UE overlap the most.

The UE may include an autonomous driving vehicle or may be included in the autonomous driving vehicle.

Another aspect of the present disclosure provides a processor for performing operations for a user equipment (UE) in a wireless communication system, the operations including receiving discontinuous reception (DRX) configuration information for each of a plurality of bandwidth parts (BWPs), the DRX configuration information including a first ON duration related to a DRX operation, and transmitting a discovery signal during the first ON duration on an activated BWP among the plurality of BWPs based on the DRX configuration information, wherein the DRX configuration information is configured for each of the plurality of BWPs.

Another aspect of the present disclosure provides a computer readable storage medium storing at least one computer program including at least one instruction for, when executed by at least one processor, causing the at least one processor to perform operations for a user equipment (UE), the operations including receiving discontinuous reception (DRX) configuration information for each of a plurality of bandwidth parts (BWPs), the DRX configuration information including a first ON duration related to a DRX operation, and transmitting a discovery signal during the first ON duration on an activated BWP among the plurality of BWPs based on the DRX configuration information, wherein the DRX configuration information is configured for each of the plurality of BWPs.

The various examples of the present disclosure described above are only some of the exemplary examples of the present disclosure, and various examples to which the technical features of various examples of the present disclosure are applied may be derived and understood based on the detailed description by those of ordinary skill in the art.

Advantageous Effects

Various embodiments of the present disclosure may have the following effects.

Various embodiments of the present disclosure may provide a method of operating a service specific low-power M-Bandwidth part (BWP) in a wireless communication system and an apparatus for supporting the method.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

In the drawings.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
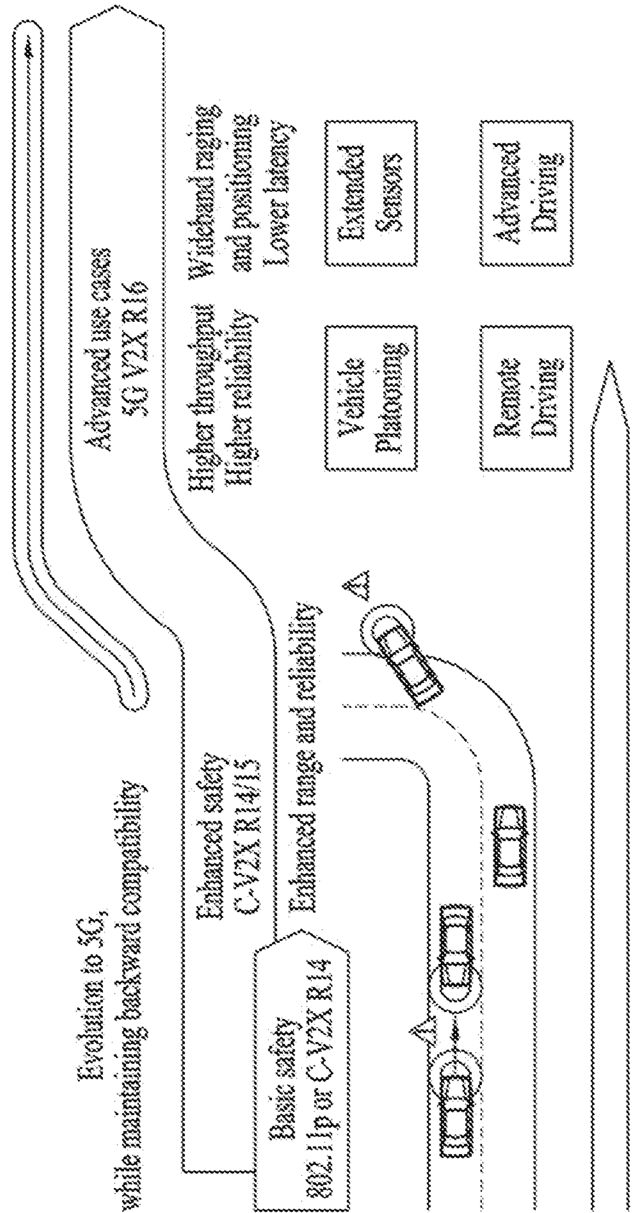
FIG. 1 is a diagram illustrating vehicle-to-everything (V2X) communication based on pre-new radio access technology (NR) RAT and V2X communication based on NR in comparison.
Figure 2:
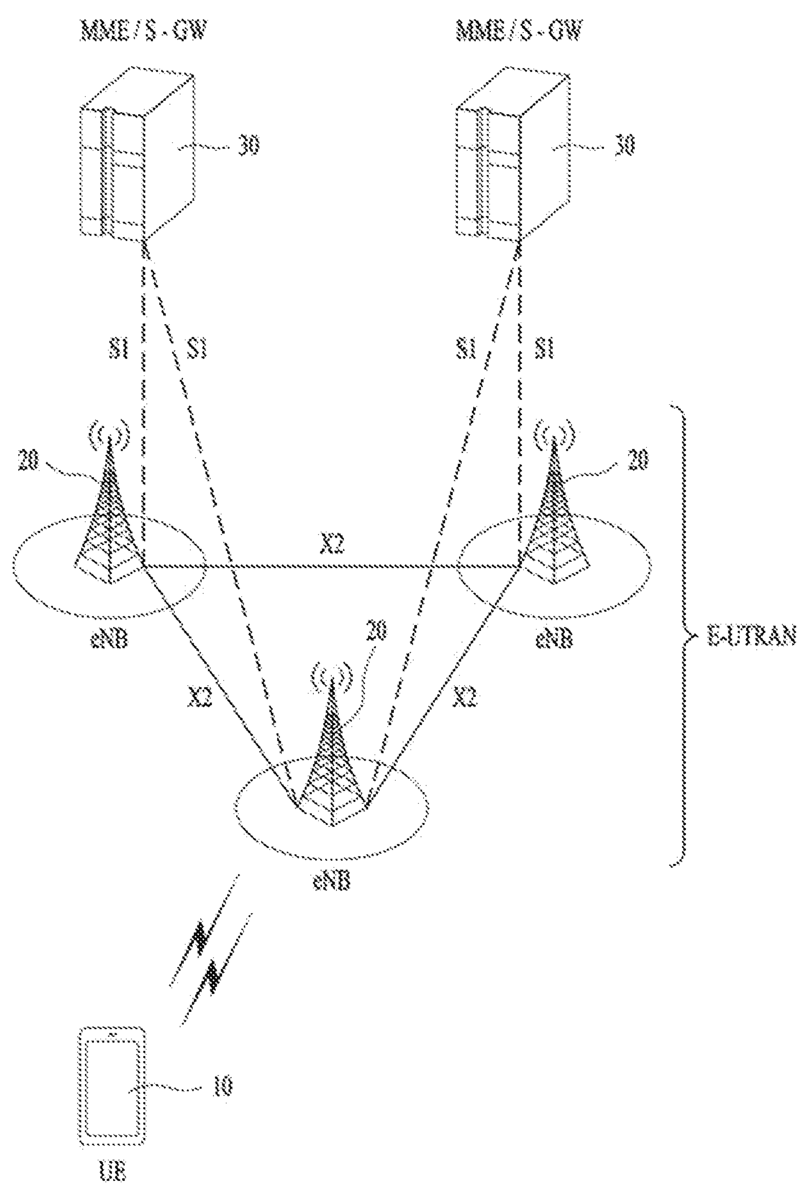
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
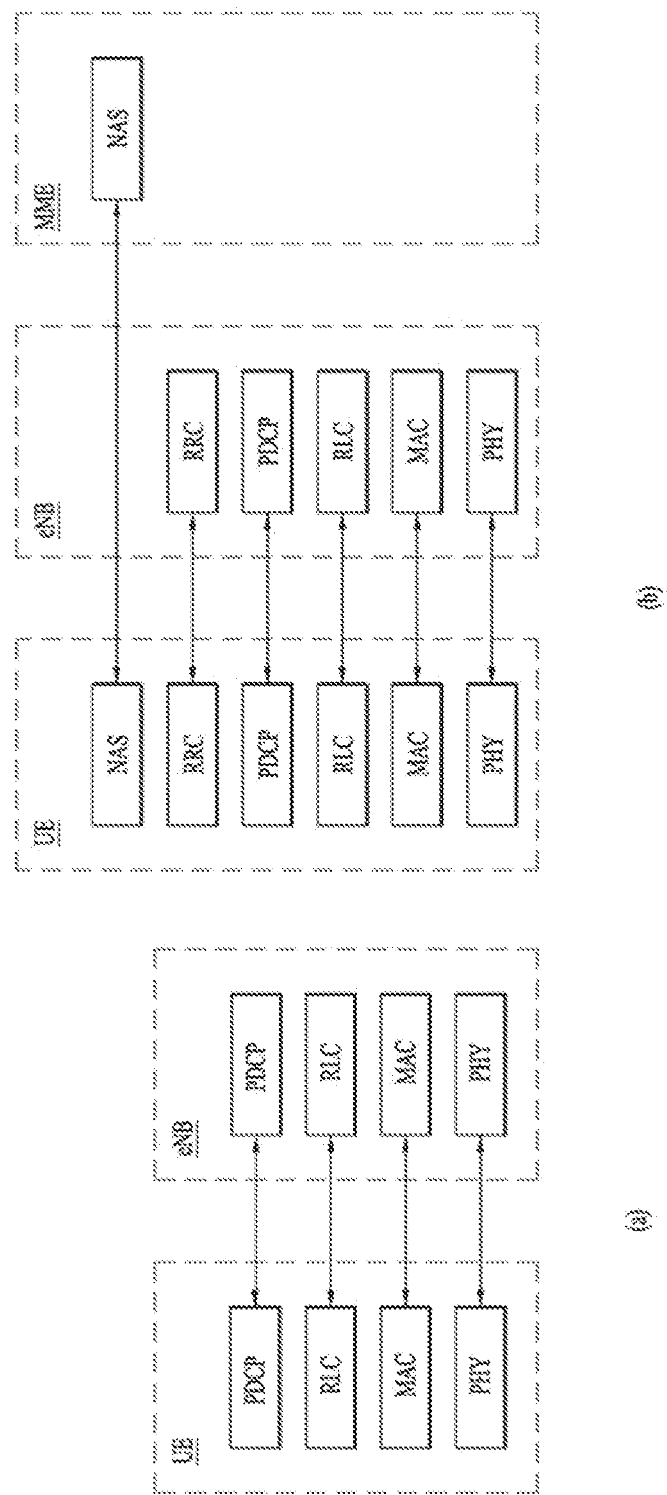
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
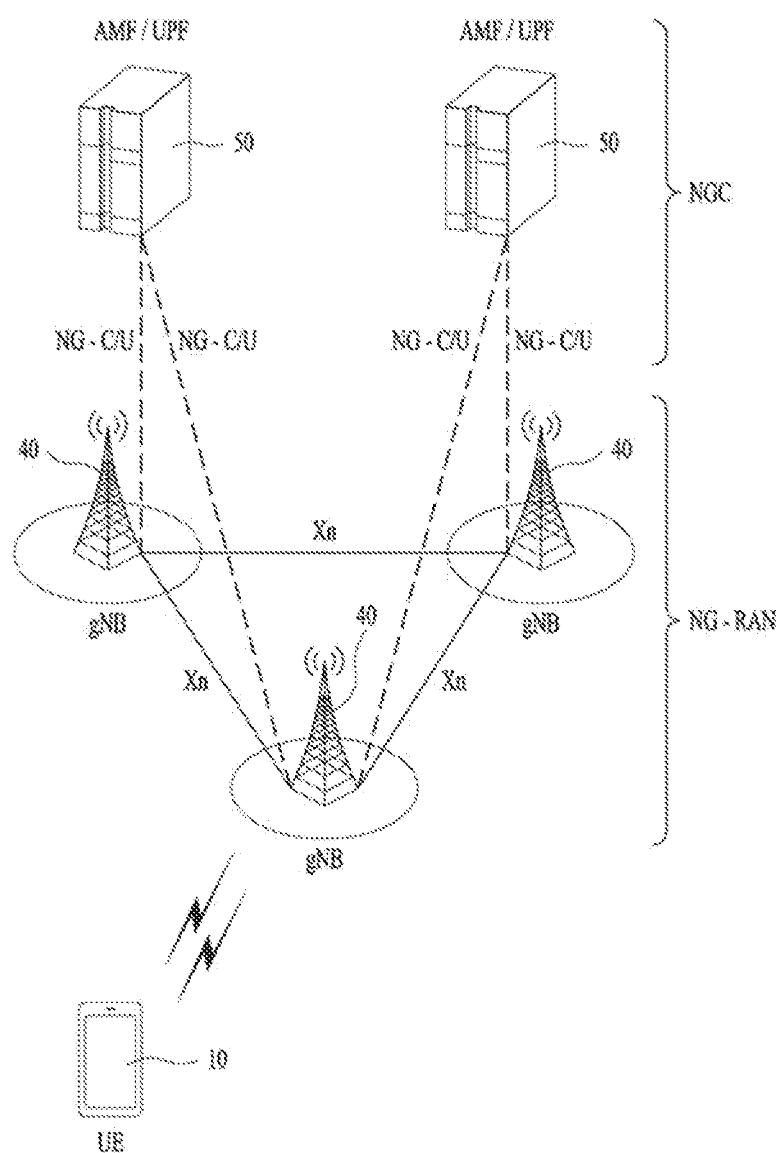
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
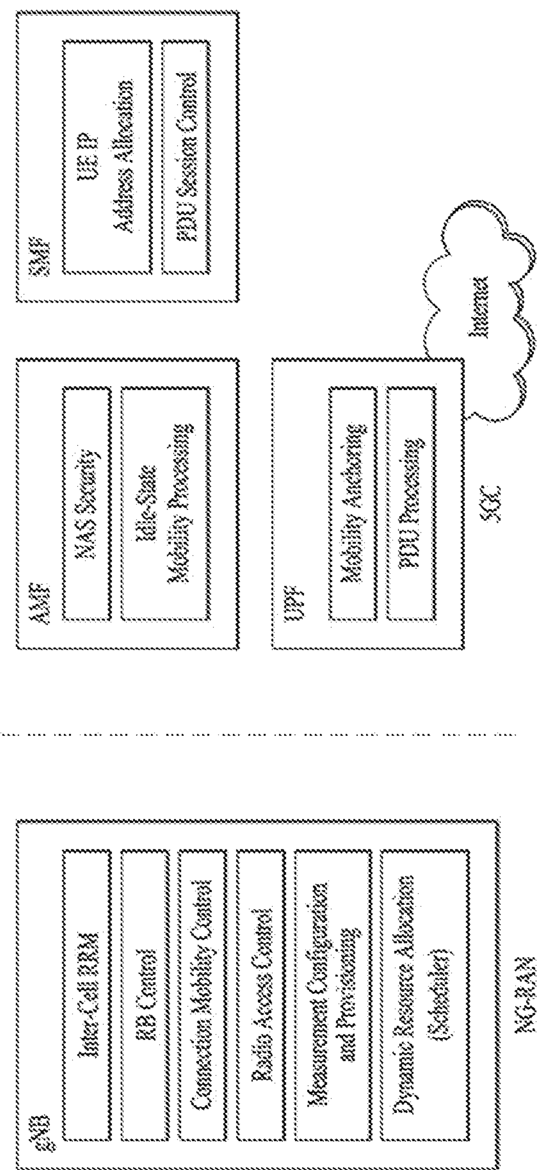
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
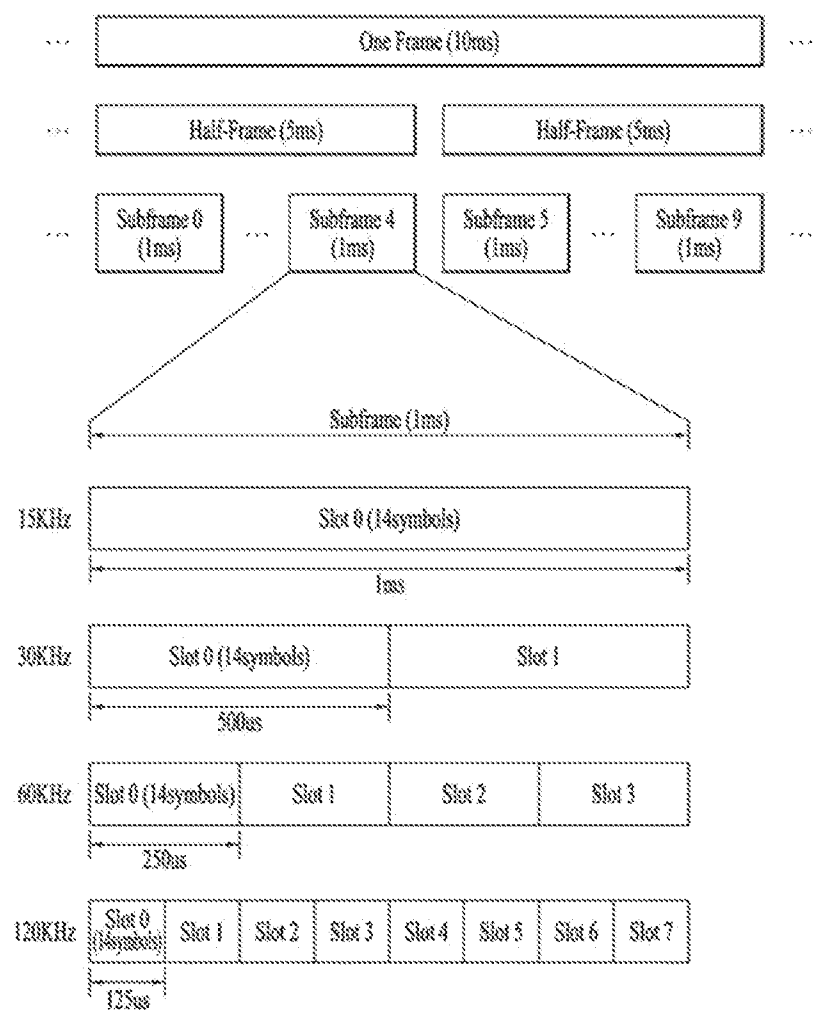
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the system, different OFDM(A) numerologies (e.g., SCSs, lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
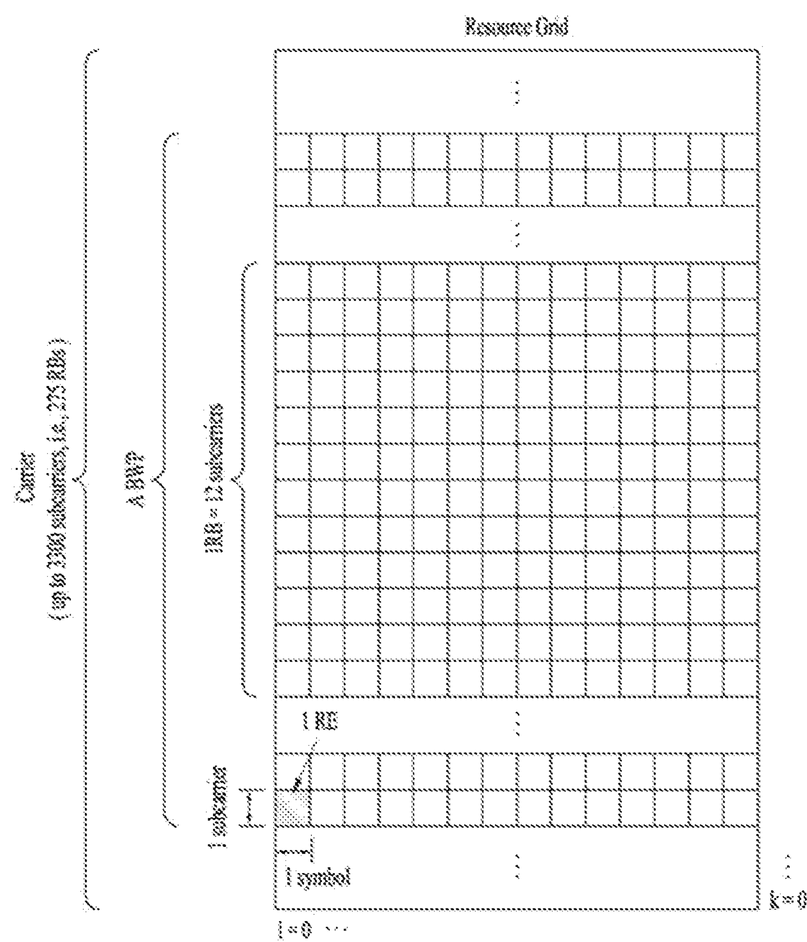
FIG. 7 is a diagram illustrating a slot structure in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5)

BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
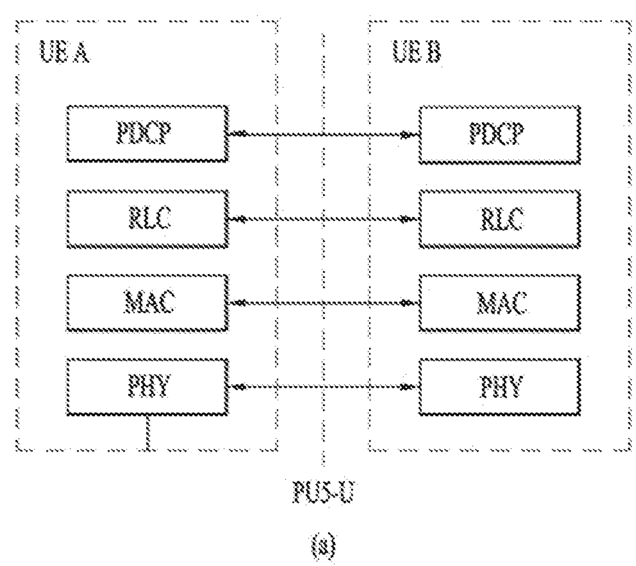
FIG. 8 is a diagram illustrating radio protocol architectures for sidelink (SL) communication according to an embodiment of the present disclosure.
Figure 8:
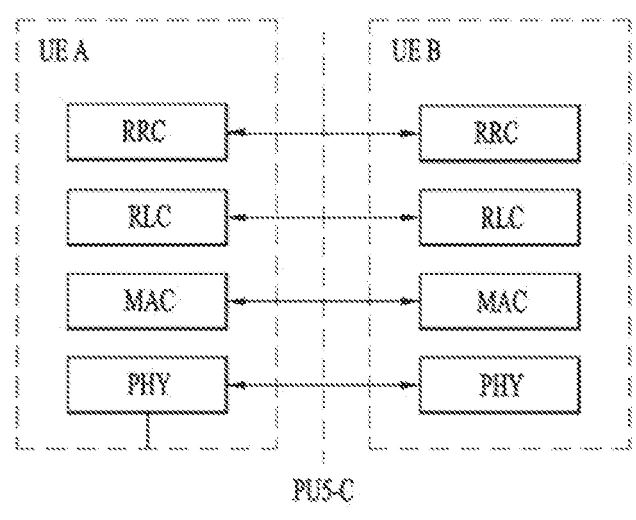

FIG. 8 illustrates a radio protocol architecture for SL communication according to an embodiment of the present disclosure. Specifically, FIG. 8(*a*) illustrates a user-plane protocol stack in LTE, and FIG. 8(*b*) illustrates a control-plane protocol stack in LTE.

Figure 9:
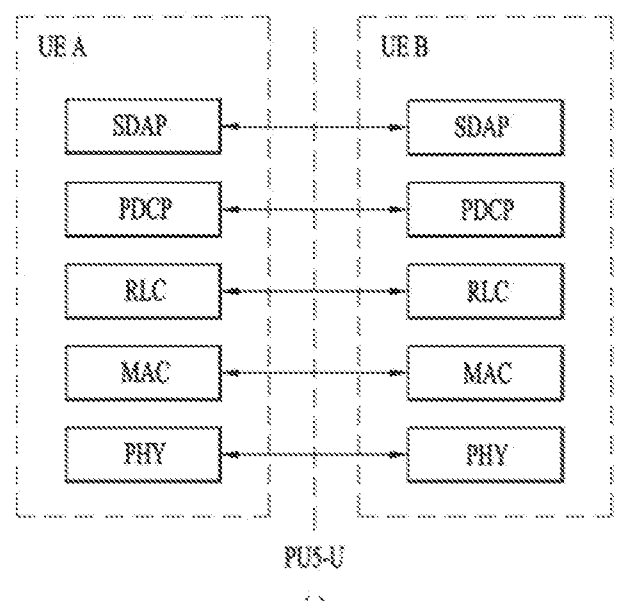
FIG. 9 is a diagram illustrating radio protocol architectures for SL communication according to an embodiment of the present disclosure.
Figure 9:
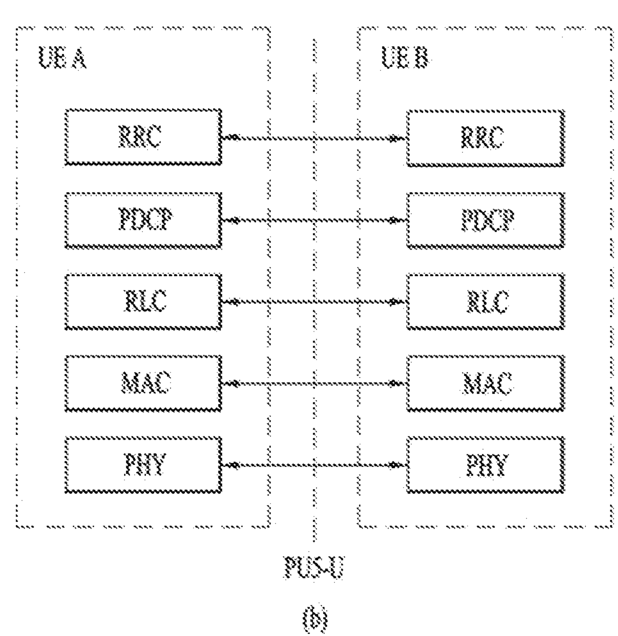

FIG. 9 illustrates a radio protocol architecture for SL communication according to an embodiment of the present disclosure. Specifically, FIG. 9(*a*) illustrates a user-plane protocol stack in NR, and FIG. 9(*b*) illustrates a control-plane protocol stack in NR.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 10:
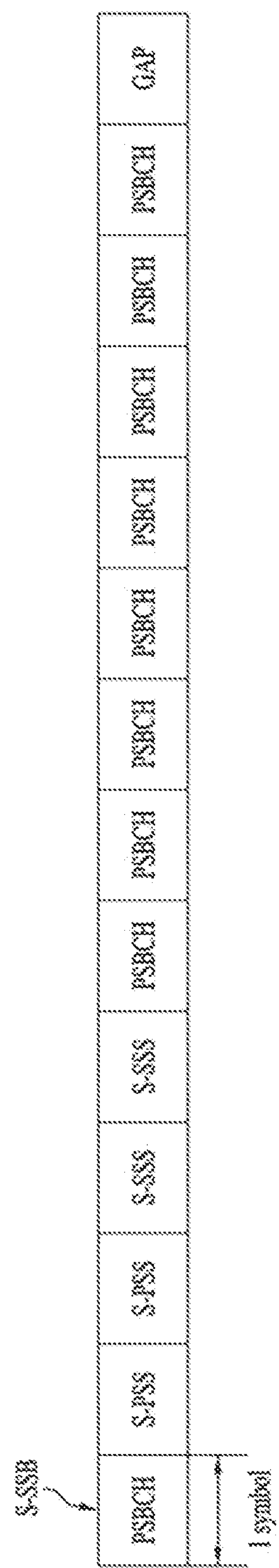
FIG. 10 is a diagram illustrating the structure of a secondary synchronization signal block (S-SSB) in a normal cyclic prefix (NCP) case according to an embodiment of the present disclosure.

FIG. 10 illustrates the structure of an S-SSB in an NCP case according to an embodiment of the present disclosure.

For example, when the CP type is NCP, FIG. 10 may be referred to for the structure of the S-SSB, that is, the order of symbols to which the S-PSS, S-SSS and PSBCH are mapped in the S-SSB transmitted by the transmitting UE.

Figure 11:
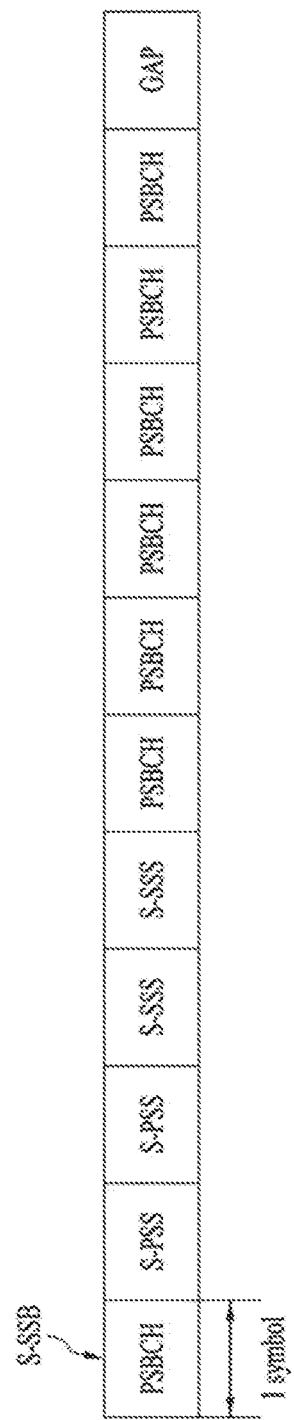
FIG. 11 is a diagram illustrating the structure of an S-SSB in an extended cyclic prefix (ECP) case according to an embodiment of the present disclosure.

FIG. 11 illustrates the structure of an S-SSB in an ECP case according to an embodiment of the present disclosure.

In the ECP case, for example, the number of symbols to which the PSBCH is mapped after the S-SSS in the S-SSB may be 6, unlike FIG. 10. Therefore, the coverage of the S-SSB may be different depending on whether the CP type is NCP or ECP.

Each SLSS may have a sidelink synchronization identifier (SLSS ID).

For example, in LTE SL or LTE V2X, the values of SLSS IDs may be defined based on combinations of two different S-PSS sequences and 168 different S-SSS sequences. For example, the number of SLSS IDs may be 336. For example, the value of an SLSS ID may be any one of 0 to 335.

For example, in NR SL or NR V2X, the values of SLSS IDs may be defined based on combinations of two different S-PSS sequences and 336 different S-SSS sequences. For example, the number of SLSS IDs may be 672. For example, the value of an SLSS ID may be any one of 0 to 671. For example, one of the two different S-PSSs may be associated with in-coverage and the other S-PSS may be associated with out-of-coverage. For example, the SLSS ID of 0 to 335 may be used for in-coverage, whereas the SLSS IDs of 336 to 671 may be used for out-coverage.

In order to improve the S-SSB reception performance of the receiving UE, the transmitting UE needs to optimize transmission power according to the characteristics of each signal included in the S-SSB. For example, the transmitting UE may determine a maximum power reduction (MPR) value for each signal included in the S-SSB according to the peak-to-average power ratio (PAPR) of the signal. For example, when the PAPR value is different between the S-PSS and the S-SSS in the S-SSB, the transmitting UE may apply an optimal MPR value to each of the S-PSS and the S-SSS to improve the S-SSB reception performance of the receiving UE. For example, a transition period may further be applied so that the transmitting UE performs an amplification operation for each signal. The transition period may preserve a time required for a transmission-end amplifier of the transmitting UE to perform a normal operation at the boundary at which the transmission power of the transmitting UE is changed. For example, the transition period may be 10 us in FR1, and 5 us in FR2. For example, a search window in which the receiving UE detects the S-PSS may be 80 ms and/or 160 ms.

Figure 12:
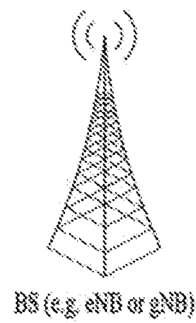
FIG. 12 is a diagram illustrating user equipments (UEs) which conduct V2X or SL communication between them according to an embodiment of the present disclosure.
Figure 12:
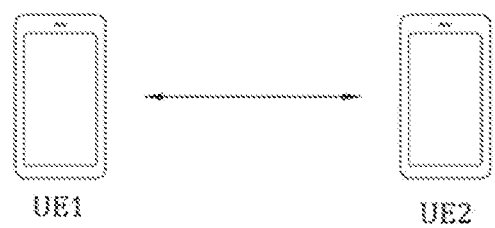

FIG. 12 illustrates UEs that conduct V2X or SL communication between them according to an embodiment of the present disclosure.

Referring to FIG. 12, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 13:
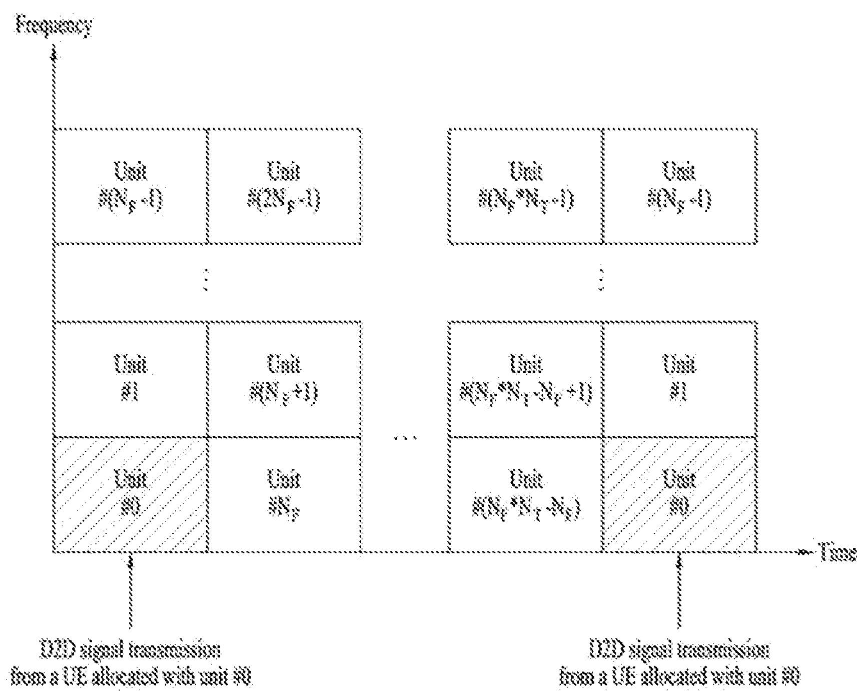
FIG. 13 is diagram illustrating resource units for V2X or SL communication according to an embodiment of the present disclosure.

FIG. 13 illustrates resource units for V2X or SL communication according to an embodiment of the present disclosure.

Referring to FIG. 13, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 14:
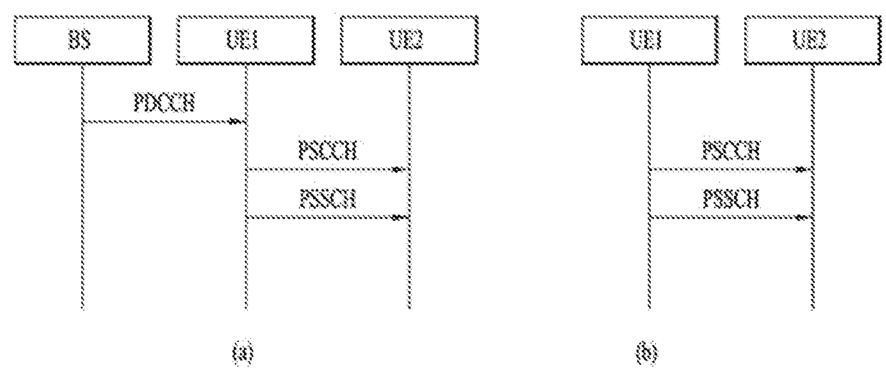
FIG. 14 is a diagram illustrating signal flows for V2X or SL communication procedures of a UE according to transmission modes according to an embodiment of the present disclosure.

FIG. 14 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 14 (*a*) illustrates a UE operation related to LTE transmission mode 1 or LTE transmission mode 3. Alternatively, for example, FIG. 14 (*a*) illustrates a UE operation related to NR resource allocation mode 1. For example, LTE transmission mode 1 may be applied to general SL communication, and LTE transmission mode 3 may be applied to V2X communication.

For example, FIG. 14 (*b*) illustrates a UE operation related to LTE transmission mode 2 or LTE transmission mode 4. Alternatively, for example, FIG. 14 (*b*) illustrates a UE operation related to NR resource allocation mode 2.

Referring to FIG. 14 (*a*), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 14 (*b*), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

A BWP and a resource pool will be described below.

When bandwidth adaptation (BA) is used, the reception bandwidth and transmission bandwidth of a UE need not be as large as the bandwidth of a cell, and may be adjusted. For example, the network/BS may inform the UE of the bandwidth adjustment. For example, the UE may receive information/a configuration for bandwidth adjustment from the network/BS. In this case, the UE may perform bandwidth adjustment based on the received information/configuration. For example, the bandwidth adjustment may include a decrease/increase of the bandwidth, a change in the position of the bandwidth, or a change in the SCS of the bandwidth.

For example, the bandwidth may be reduced during a time period of low activity in order to save power. For example, the position of the bandwidth may be shifted in the frequency domain. For example, the position of the bandwidth may be shifted in the frequency domain to increase scheduling flexibility. For example, the SCS of the bandwidth may be changed. For example, the SCS of the bandwidth may be changed to allow a different service. A subset of the total cell bandwidth of a cell may be referred to as a BWP. BA may be implemented by configuring BWPs for the UE and indicating a current active BWP among the configured BWPs to the UE by the BS/network.

Figure 15:
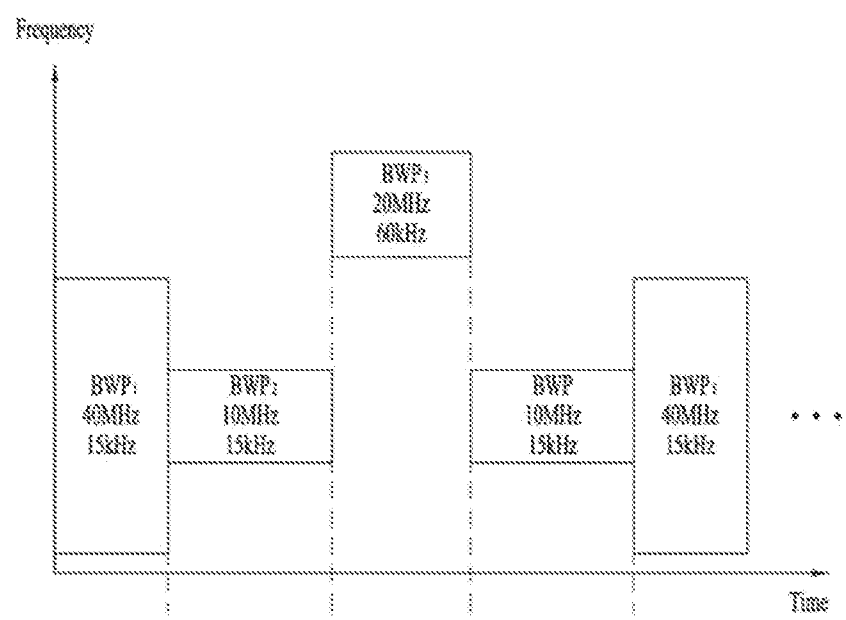
FIG. 15 illustrates a plurality of BWPs according to an embodiment of the present disclosure.

FIG. 15 illustrates a plurality of BWPs according to an embodiment of the present disclosure.

Referring to FIG. 15, BWP1 having a bandwidth of 40 MHz and an SCS of 15 kHz, BWP2 having a bandwidth of 10 MHz and an SCS of 15 kHz, and BWP3 having a bandwidth of 20 MHz and an SCS of 60 kHz may be configured.

Figure 16:
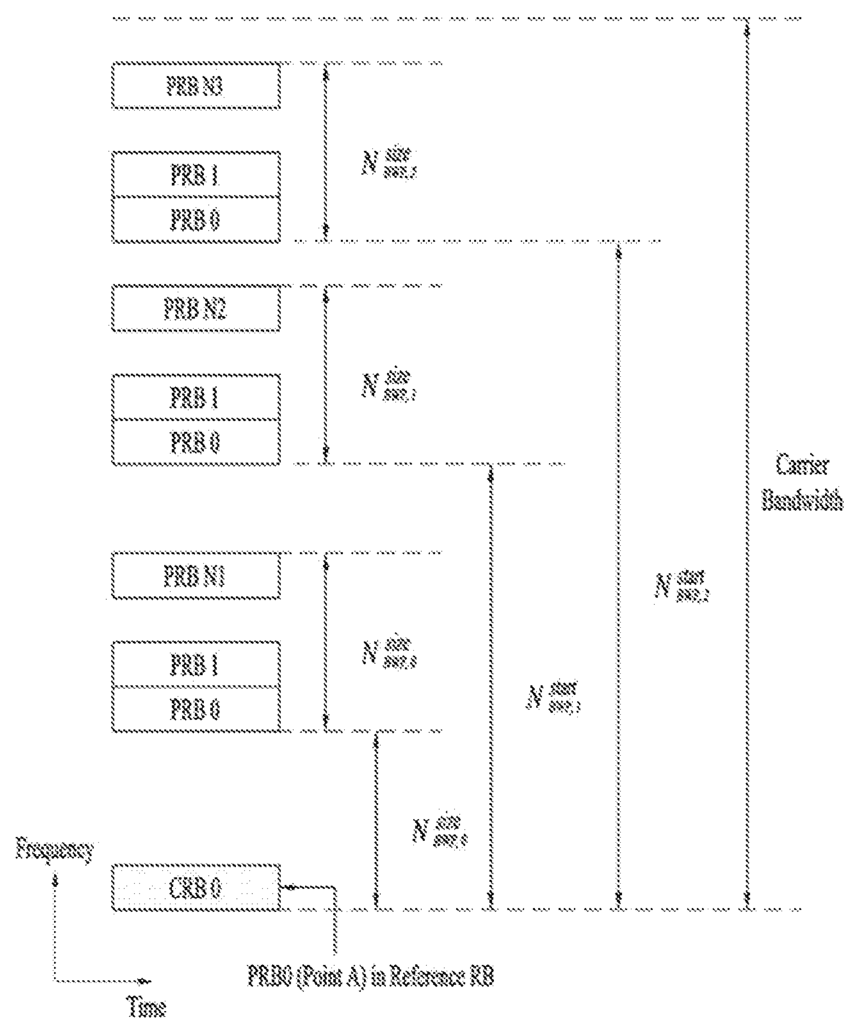
FIG. 16 illustrates BWPs according to an embodiment of the present disclosure.

FIG. 16 illustrates BWPs according to an embodiment of the present disclosure. In the embodiment of FIG. 16, it is assumed that there are three BWPs.

Referring to FIG. 16, common resource blocks (CRBs) may be carrier RBs numbered from one end of a carrier band to the other end of the carrier band. PRBs may be RBs numbered within each BWP. A point A may indicate a common reference point for a resource block grid.

A BWP may be configured by the point A, an offset NstartBWP from the point A, and a bandwidth NsizeBWP. For example, the point A may be an external reference point for a PRB of a carrier, in which subcarrier 0 is aligned for all numerologies (e.g., all numerologies supported in the carrier by the network). For example, the offset may be a PRB interval between the lowest subcarrier for a given numerology and the point A. For example, the bandwidth may be the number of PRBs for the given technology.

A BWP may be defined for SL. The same SL BWP may be used for transmission and reception. For example, a transmitting UE may transmit an SL channel or an SL signal in a specific BWP, and a receiving UE may receive the SL channel or the SL signal in the specific BWP. In a licensed carrier, an SL BWP may be defined separately from a Uu BWP, and have separate configuration signaling from the Uu BWP. For example, a UE may receive a configuration for the SL BWP from the BS/network. The SL BWP may be (pre)configured for an out-of-coverage NR V2X UE and an RRC_IDLE UE in the carrier. For a UE in RRC_CONNECTED mode, at least one SL BWP may be activated in the carrier.

A resource pool may be a set of time-frequency resources available for SL transmission and/or SL reception. From the viewpoint of a UE, time-domain resources of a resource pool may not be contiguous. A plurality of resource pools may be (pre)configured for the UE in one carrier. From the viewpoint of the PHY layer, the UE may perform unicast, groupcast, and broadcast communication using a configured or preconfigured resource pool.

SL congestion control will be described below.

When the UE autonomously determines SL transmission resources, the UE also autonomously determines the size and frequency of the resources used by itself. Obviously, due to constraints from the network, the use of resource sizes or frequencies above a certain level may be limited. However, in a situation in which a large number of UEs are concentrated in a specific region at a specific time point, when all the UEs use relatively large resources, overall performance may be greatly degraded due to interference.

Therefore, the UE needs to observe a channel condition. When the UE determines that excessive resources are being consumed, it is desirable for the UE to take an action of reducing its own resource use. In this specification, this may be referred to as congestion control. For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 17:
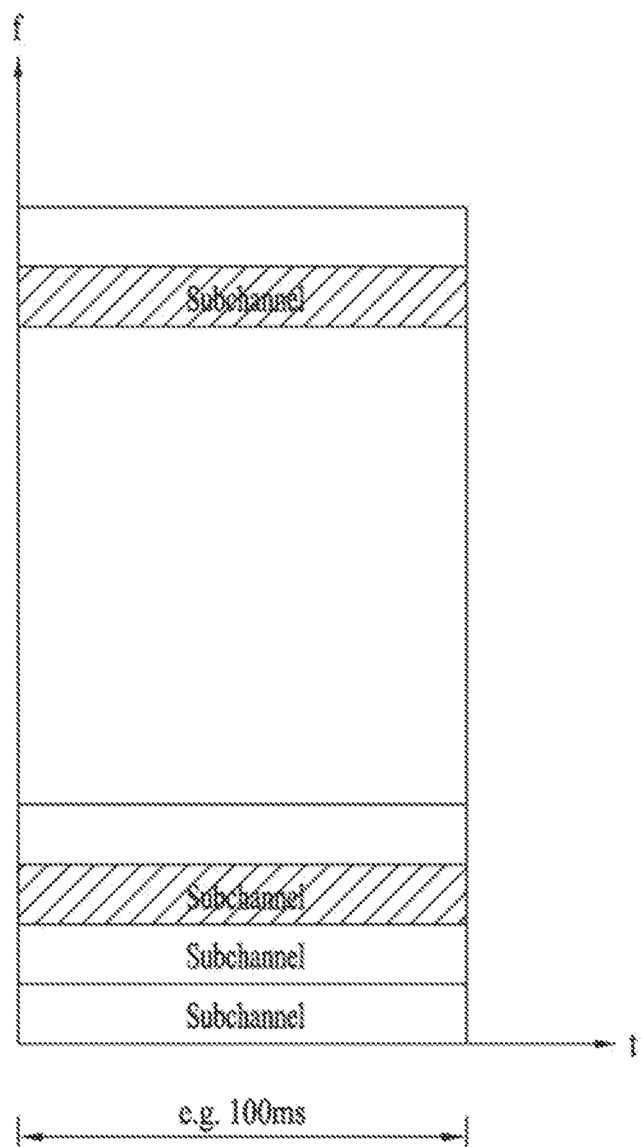
FIG. 17 illustrates resource units for CBR measurement according to an embodiment of the present disclosure.

FIG. 17 illustrates resource units for CBR measurement according to an embodiment of the present disclosure.

Referring to FIG. 17, a CBR may refer to the number of sub-channels of which the RSSI measurements are equal to or larger than a predetermined threshold as a result of measuring an RSSI in each sub-channel during a specific period (e.g., 100 ms) by a UE. Alternatively, a CBR may refer to a ratio of sub-channels having values equal to or greater than a predetermined threshold among sub-channels during a specific period. For example, in the embodiment of FIG. 18, on the assumption that the hatched sub-channels have values greater than or equal to a predetermined threshold, the CBR may refer to a ratio of hatched sub-channels for a time period of 100 ms. In addition, the UE may report the CBR to the BS.

Figure 18:
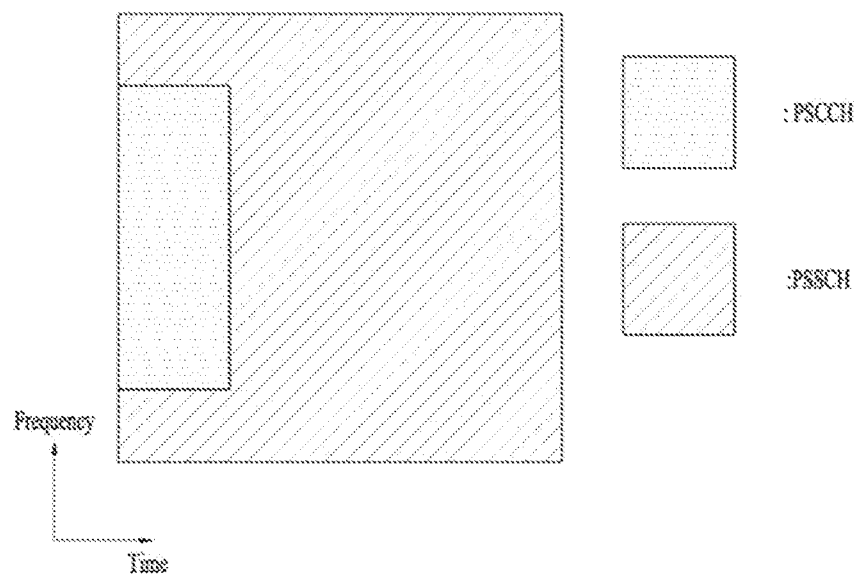
FIG. 18 illustrates an example of the case in which a PSCCH and a PSSCH are multiplexed.

For example, when a PSCCH and a PSSCH are multiplexed as illustrated in the embodiment of FIG. 18, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

The UE according to various embodiments of the present disclosure may perform a discontinuous reception (DRX) operation while performing the aforementioned description/proposed procedure and/or methods. The UE configured with DRX may reduce power consumption by discontinuously receiving a DL signal. The DRX may be performed in a radio resource control (RRC)_IDLE state, an RRC_INACTIVE state, and an RRC_CONNECTED state. In the RRC_IDLE state and the RRC_INACTIVE state, the DRX may be used to discontinuously receive a paging signal.

RRC_CONNECTED DRX

In the RRC_CONNECTED state, the DRX may be used in discontinuous reception of a PDCCH. For convenience, the DRX performed in the RRC_CONNECTED state may be referred to as RRC_CONNECTED DRX.

A DRX cycle may include an On Duration and an Opportunity for DRX. The DRX cycle may define a time interval at which the On Duration is periodically repeated.

The On Duration may refer to a time duration in which the UE monitors the PDCCH to receive the same. When the DRX is configured, the UE may perform PDCCH monitoring for the On Duration. When there is a PDCCH that is successfully detected during PDCCH monitoring, the UE may operate an inactivity timer to maintain an awake state. In contrast, when there is no PDCCH that is successfully detected during PDCCH monitoring, the UE may enter a sleep state after the On Duration ends. Thus, when the DRX is configured, PDCCH monitoring/reception may be discontinuously performed when the aforementioned description/proposed procedure and/or method are performed. For example, when the DRX is configured, a PDCCH reception occasion (e.g., a slot having a PDCCH search space) may be discontinuously configured according to a DRX configuration in various embodiments of the present disclosure. In contrast, when the DRX is not configured, PDCCH monitoring/reception may be continuously performed in the time domain when the aforementioned description/proposed procedure and/or method are performed. For example, when the DRX is not configured, the PDCCH reception occasion (e.g., a slot having a PDCCH search space) may be continuously configured in various embodiments of the present disclosure. Irrespective of whether the DRX is configured, PDCCH monitoring may be limited in a time duration configured as a measurement gap.

Table 5 shows a procedure of a UE related to the DRX (RRC_CONNECTED state). Referring to Table 5, DRX configuration information may be received through higher layer (e.g., RRC) signaling and whether DRX ON/OFF may be controlled by a DRX command of a MAC layer. When the DRX is configured, the UE may discontinuously perform PDCCH monitoring when performing the procedure and/or method described/proposed in various embodiments of the present disclosure.

TABLE 5

| | Type of signals | UE procedure |
|---|---|---|
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

Here, MAC-CellGroupConfig may include configuration information required to configure a medium access control (MAC) parameter for a cell group. The MAC-CellGroupConfig may also include configuration information about the DRX. For example, the MAC-CellGroupConfig may include information to define the DRX as follows.

- Value of drx-OnDurationTimer: This defines a length of a start duration of a DRX cycle.
- Value of drx-InactivityTimer: This defines a length of a time duration in which the UE is in an awake state after a PDCCH occasion in which a PDCCH indicating initial UL or DL data is detected.
- Value of drx-HARQ-RTT-TimerDL: This defines a length of the maximum time duration until DL retransmission is received after DL initial transmission is received.
- Value of drx-HARQ-RTT-TimerDL: This defines a length of the maximum time duration until a grant for UL transmission is received after a grant for UL initial transmission is received.
- drx-LongCycleStartOffset: This defines a time length and a starting point of a DRX cycle.
- drx-ShortCycle (optional): This defines a time length of a short DRX cycle.

Here, when any one of the drx-OnDurationTimer, drx-InactivityTimer, the drx-HARQ-RTT-TimerDL, and the drx-HARQ-RTT-TimerDL is currently operated, the UE may perform PDCCH monitoring for every PDCCH occasion while maintaining the awake state.

RRC_IDLE DRX

In the RRC_IDLE state and the RRC_INACTIVE state, the DRX may be used in discontinuous reception of a paging signal. For convenience, the DRX performed in the RRC_IDLE (or RRC_INACTIVE) state may be referred to as RRC_IDLE DRX.

Thus, when the DRX is configured, PDCCH monitoring/reception may be discontinuously performed in the time domain when the aforementioned description/proposed procedure and/or method are performed.

The DRX may be configured for discontinuous reception of the paging signal. The UE may receive DRX configuration information from a base station (BS) through higher layer (e.g., RRC) signaling. The DRX configuration information may include configuration information about a DRX cycle, a DRX offset, and a DRX timer. The UE may repeat an On Duration and a Sleep duration according to a DRX cycle. The UE may operate in a wakeup mode during the On duration and may operate in a sleep mode during the Sleep duration. In the wakeup mode, the UE may monitor a paging occasion (PO) in order to receive a paging message. The PO may refer to a time resource/duration (e.g., a subframe or a slot) in which the UE expects to receive the paging message. PO monitoring may include monitoring a PDCCH (or an MPDCCH or an NPDCCH) (hereinafter, a paging PDCCH) scrambled with a P-RNTI in the PO. The paging message may be included in a paging PDCCH or may be included in a PDSCH scheduled by a paging PDCCH. One or a plurality of PO(s) may be included in a paging frame (PF), and the PF may be periodically configured based on a UE ID. Here, the PF may correspond to one radio frame, and the UE ID may be determined based on an international mobile subscriber identity (IMSI) of the UE. When the DRX is configured, the UE may monitor only one PO per DRX cycle. When the UE receives a paging message indicating an ID of the UE and/or system information in the PO, the UE may perform an RACH procedure in order to initialize (or reconfigure) connection with the BS or may receive (or acquire) new system information from the BS. Thus, when the aforementioned description/proposed procedure and/or method are performed, the RACH may be performed for connection with the BS or PO monitoring may be discontinuously performed in the time domain in order to receive (or acquire) new system information from the BS.

Hereinafter, the present disclosure will describe various examples related to a DRX operation in sidelink.

1. DRX Operation in SL for Service Specific BWP

In NR, up to four BWPs representing a continuous set of RBs may be allocated to the UE, and only one BWP among the four BWPs may be activated and used. In this case, different numerologies (e.g., SCS or TTI) may be configured for each BWP. However, use of a multiple BWP (M-BWP) may be considered for effective communication in consideration of a difference in capabilities and power consumption of individual UEs, etc.

Hereinafter, the following scenario may be assumed as various examples related to a DRX operation in SL for a service specific BWP according to the present disclosure. In detail, it may be assumed that the frequency domain of a wide BWP (W-BWP) and a narrow BWP (N-BWP) is (pre)configured by a network or the like and that a frequency gap is allocated in consideration of in-band emission between N-BWPs. In this case, a UE that uses the N-BWP may select/convert an N-BWP to be used by the UE, and an available frequency width may be different according to a difference in capacities between UEs. Here, selecting/converting the N-BWP by the UE may mean that the UE selects any one of a plurality of (pre)configured N-BWPs or changes the selected N-BWP to another N-BWP.

An available service may be (pre)configured according to each N-BWP, and a UE that uses the W-BWP and a UE that uses the N-BWP may be assumed to be in an environment that requires a low power operation such as the DRX. An available service for each BWP may be limited, which may be assumed to affect a configuration of a pattern of the DRX for each BWP. Hereinafter, various examples of a method of operating a service specific low-power M-BWP using a DRX mode in an environment in which the M-BWP is activated will be described.

According to the present disclosure, the case in which one UE performs unicast/broadcast/groupcast through sidelink with various UEs and each of a TX UE and a RX UE operates in a DRX mode may be assumed. As such, when an arbitrary TX UE and RX UE operate in a DRX mode, information on a DRX pattern of each UE may be required.

For example, even if data to be transmitted from the TX UE is generated, when the RX UE is not in an awake state, the RX UE may not receive the data. Thus, there may be cases in which it is not possible to transmit data that is immediately generated in sidelink communication, thereby causing latency.

In order to overcome the aforementioned latency problem, the DRX patterns of the TX UE and the RX UE may be different, but in this case, when data to be transmitted from one UE is generated, even if the current timing is not a timing at which the UE wakes up, the UE needs to wake up and transmit data according to a DRX pattern of a counterpart UE.

Only in terms of a low-power operation, when the TX UE and the RX UE have the same pattern, if a UE transmits data at the timing at which the UE is supposed to wake up, the RX UE may be capable of receiving the data, and thus power consumption may be the smallest because power is no power is consumed by waking up for transmission. However, when this operation is performed, the TX UE and the RX UE may simultaneously transmit data, and thus collision may be more likely to occur due to half duplex.

Figure 19:
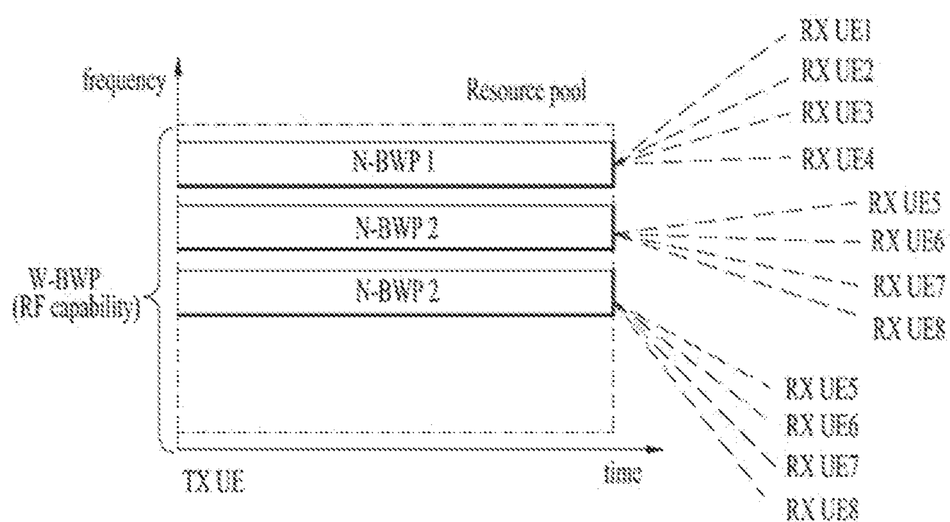
FIG. 19 is a diagram for explaining a DRX operation in an M-BWP according to an embodiment of the present disclosure.

FIG. 19 is a diagram for explaining a DRX operation in an M-BWP according to an embodiment of the present disclosure.

Referring to FIG. 19, as described above, it may be assumed that a service that enables transmission for each N-BWP is (pre)configured, a UE having large RF capability for activating and using the M-BWP may be referred to as a TX UE, and a UE having small RF capability for activating and using only the N-BWP may be referred to as a RX UE. For example, the TX UE may be a vehicle UE, a road side unit (RSU) UE, or the like, and the RX UE may be a personal mobile UE.

A type of an available service for each N-BWP may be (pre)configured, and a DRX pattern (e.g., a period, an On duration, or a start offset time) may be determined depending on the service. In other words, DRX configuration information for configuring the DRX pattern may be separately configured for each M-BWP.

For example, RX UEs 1 to 4 may activate and use an N-BWP 1 of an M-BWP for sidelink communication, RX UEs 5 to 8 may activate and use an N-BWP 2 of the M-BWP, and RX UEs 9 to 12 may activate and use an N-BWP 3 of the M-BWP.

Figure 20:
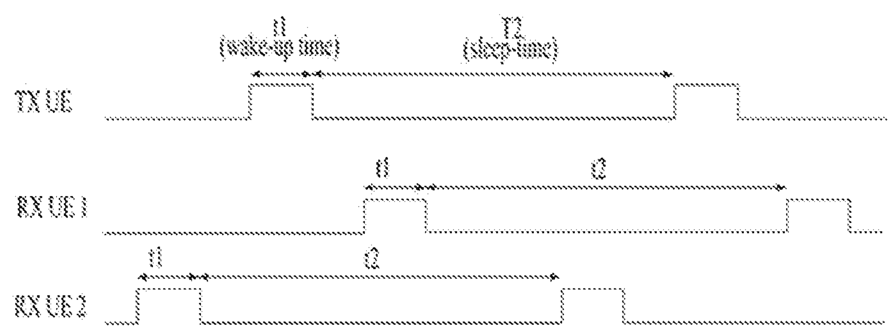
FIG. 20 is a diagram showing different DRX patterns according to an embodiment of the present disclosure.

FIG. 20 is a diagram showing different DRX patterns according to an embodiment of the present disclosure.

Referring to FIG. 20, even if a DRX pattern is (pre) configured in a specific N-BWP, a DRX pattern of a TX UE and a DRX pattern of a RX UE may deviate from each other. In this case, there may be a problem in that the TX UE and the RX UE are not capable of detecting each other.

Hereinafter, examples of a method of detecting a DRX (pre)configured in each BWP included in an M-BWP will be described.

Method 1-1

In Method 1-1 according to the present disclosure, the "minimum period in which a discovery message needs to be broadcast", that is, the "at least one discovery message needs to be transmitted in a set minimum period" may be (pre) configured for each N-BWP. The minimum in which the discovery message needs to be broadcast may have different values for respective N-BWPs.

The discovery message may also include a DRX pattern is currently used by a UE, that is, a DRX pattern that is used by a UE that transmits the discovery message. Thus, the UE that intends to perform communication may operate in an On state during the "minimum period in which the discovery message needs to be broadcast" (pre)configured in the corresponding N-BWP, and may recognize a DRX pattern of a target UE with which the UE intends to communicate through the discovery message received during this time.

For example, the UE may operate in the On state during the "minimum period in which the discovery message needs to be broadcast" in addition to the DRX pattern configured in the activated BWP.

Method 1-2

In Method 1-2 according to the present disclosure, an absolute time for common wakeup of all TX/RX UEs that communicate in a corresponding N-BWP may be (pre) configured. For example, when a GNSS time changes in seconds or when it is assumed that an absolute number of frames is present in the same synchronous cluster, all TX/RX UEs that intend to communicate in a corresponding N-BWP may operate to wake up in a specific frame number value. For example, the specific frame number may be a system frame number (SFN).

Figure 21:
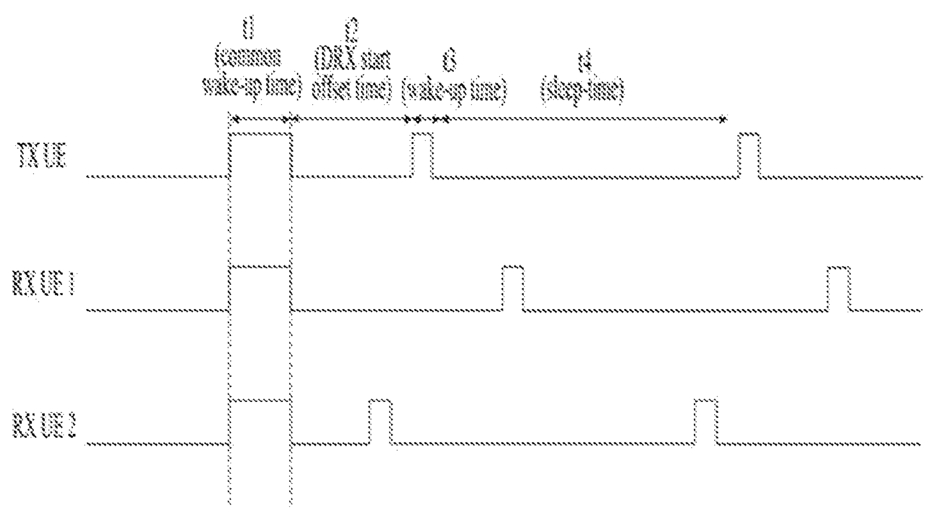
FIG. 21 is a diagram for explaining a DRX pattern configured with a common wake-up time according to an embodiment of the present disclosure.

FIG. 21 is a diagram for explaining a DRX pattern configured with a common wake-up time according to an embodiment of the present disclosure.

Referring to FIG. 21, the common wake-up time may be (pre)configured to each of TX and RX UEs. The common wake-up time may also be referred to as a common on-duration. In this case, each of the TX and RX UEs may recognize the DRX pattern between the TX and RX UEs by exchanging the DRX pattern with each other at a location on the time domain corresponding to the (pre)configured common wake-up time.

For example, any one UE may transmit a discovery message including a DRX pattern used by the UE to another UE during the common wake-up time and the other UE may receive the discovery message in the wakeup state during the common wake-up time to recognize the DRX pattern of the UE that transmits the discovery message.

As the DRX patterns of the TX UE and the RX UE are the same, it may not be necessary to turn on a device for transmission in accordance with a DRX pattern of a counterpart UE, thereby lowering power consumption. Assuming that only a limited service is permitted in a corresponding N-BWP, it may be advantageous for as many UEs as possible to wake up at a specific time to transmit/receive mutual information. In this case, it may be necessary to match the DRX patterns of the TX UE and the RX UEs.

Hereinafter, the present disclosure will describe various examples of a method of matching DRX patterns of all RX UEs that communicate with a specific UE (e.g., a TX UE that is capable of activating multiple N-BWPs) when the specific UE plays a dominant role to determine the DRX pattern.

Method 1-3 (Negotiation)

In Method 1-3 according to the present disclosure, RX UEs may inform a TX UE of a DRX pattern that is currently used by the RX UE and a candidate DRX pattern other than the currently used DRX pattern through a discovery message, a sidelink control/data message, or the like. Upon receiving this, the TX UE may search for a DRX pattern that most closely matches a DRX pattern available by the TX UE using the currently used DRX pattern of the RX UE and the recognized candidate DRX pattern.

In other words, the TX UE may receive information on DRX patterns respectively used by a plurality of RX UEs and candidate DRX patterns from the plurality of RX UEs, may compare 1) a DRX pattern used by the TX UE, 2) the DRX patterns respectively used by the plurality of RX UEs, and 3) the respective candidate DRX patterns of the plurality of RX UEs, and may configure a DRX pattern with the most common ON durations as a result of comparison. In this case, the newly configured DRX pattern may include only an ON duration that overlaps the most with another ON duration.

Then, the TX UE may broadcast a selected DRX pattern using a discovery message or the like, and upon receiving this, the RX UE may align a DRX pattern thereof with an available DRX pattern. That is, the RX UE may use the received DRX pattern as a DRX pattern thereof.

Method 1-4 (Designation)

In Method 1-4 according to the present disclosure, a specific UE (here, a TX UE having large RF capability/having a relatively sufficient power margin/mainly broadcasting a service) may generate a DRX pattern suitable for its own use.

For example, the specific UE may generate a new DRX pattern by adding a random ON duration pattern suitable for its own use within a power tolerance.

For example, the specific UE may indicate that it is a specific UE that plays a dominant role in forming the DRX pattern to broadcast the corresponding pattern using a discovery message or the like, and upon receiving this, the RX UE may match a DRX pattern thereof to the DRX pattern used by the TX UE within a possible range. That is, the specific UE may broadcast a DRX pattern generated according to the aforementioned example and information (i.e., a UE ID) of the UE that generates the DRX pattern to the RX UE based on the discovery message or the like.

In terms of a TX UE that activates and uses multiple N-BWPs, a low power operation may be possible as ON durations between different N-BWPs match each other for the low power operation. Thus, the TX UE may arrange DRX patterns of the respective N-BWPs to match each other as much as possible according to its power situation. This is because the TX UE needs to play a dominant role in the aforementioned method of determining a DRX pattern according to the present disclosure.

Figure 22:
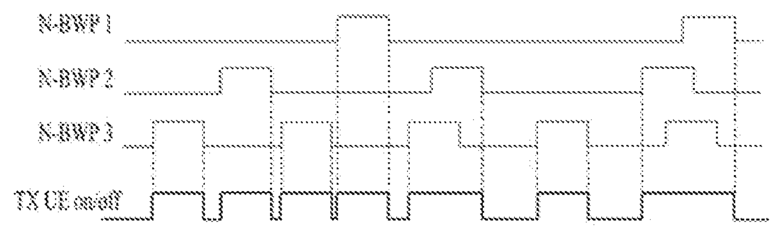
FIG. 22 is a diagram for explaining a DRX pattern of a TX UE according to an embodiment of the present disclosure.
Figure 22:
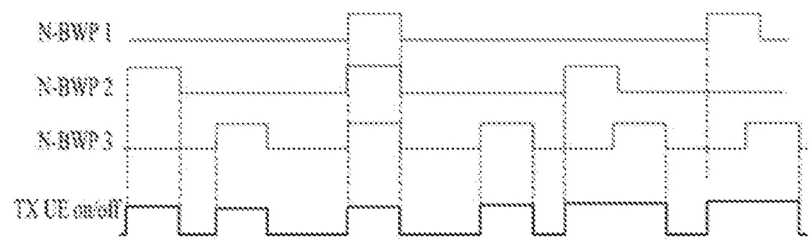

FIG. 22 is a diagram for explaining a DRX pattern of a TX UE according to an embodiment of the present disclosure.

Referring to FIG. 22(*a*), when DRX patterns for respective N-BWPs do not overlap relatively, if the TX UE intends to generate a DRX pattern in which ON durations between the multiple N-BWPs overlap the most with each other, there may be relatively many ON durations according to the generated DRX pattern, and thus power consumption may be increased.

Referring to FIG. 22(*b*), when DRX patterns for respective N-BWPs overlap relatively, if the TX UE intends to generate a DRX pattern in which ON durations between the multiple N-BWPs overlap the most with each other, there may be relatively few ON durations according to the generated DRX pattern, and thus power consumption may be reduced.

As described above, in consideration of power consumption depending on an ON duration, when the TX UE determines a new DRX pattern in a specific N-BWP, the TX UE may first generate a DRX pattern candidate to be generated in the corresponding N-BWP according to the present disclosure (in this case, the TX UE may refer to information received from a neighboring RX UE).

Then, the TX UE may apply a weight according to the number/degree in which a DRX pattern candidate overlaps a previously formed DRX pattern in another N-BWP in a predetermined time domain. Then, the TX UE may determine a DRX pattern candidate applied with the highest weight as a new DRX pattern of the TX UE. In this case, in terms of the TX UE, a DRX pattern in a corresponding N-BWP may be generated in consideration of a low-power operation.

After the DRX pattern is determined, a discovery message and CCH/SCH information may be transmitted/received during an ON duration of the DRX pattern. In this case, the discovery message for mutual connection may need to be protected.

According to the present disclosure, in order to protect the discovery message, for example, a discovery pool for transmission of the discovery message may be separately determined in the determined DRX pattern. In this case, the discovery pool may be TDM or FDM.

Alternatively, priorities may be differently for the discovery message. That is, the discovery message may be configured to have a higher priority than the CCH/SCH.

Alternatively, different congestion control may be applied to the discovery message.

When multiple services are allocated to the same N-BWP, if the priorities for respective services are the same, there may be a high possibility that resources collide in an ON duration of the DRX. In addition, even if priorities for respective services are different, there may be still a possibility of resource collision.

In order to reduce collision between services that occur during the ON duration of the DRX, an order of accessing a resource may be changed depending on the priority of the service according to the present disclosure.

Figure 23:
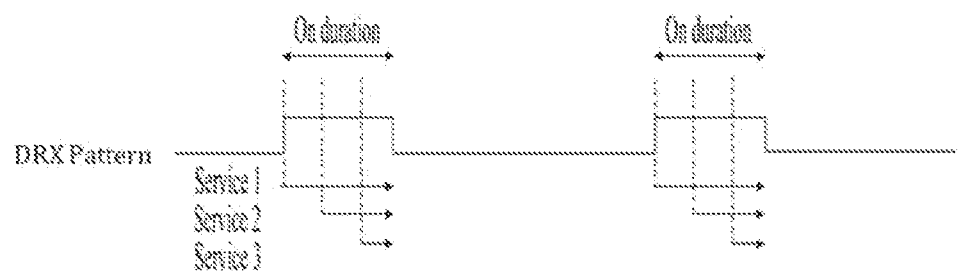
FIG. 23 is a diagram for explaining a DRX operation for priorities of respective services according to an embodiment of the present disclosure.

FIG. 23 is a diagram for explaining a DRX operation for priorities of respective services according to an embodiment of the present disclosure.

Referring to FIG. 23, assuming that an ON duration includes three subframes, a service 1 with the highest priority may have an occasion in which a resource is to be selected during subframes 1, 2, and 3, a service 2 may have an occasion in which a resource is to be selected during subframes 2 and 3, and a service 3 with the lowest priority may select a resource only in a subframe 3 and may start transmission.

2. DRX Operation in SL Based on Common DRX Pattern

Hereinafter, according to the present disclosure, a TX UE in a DRX operation in SL based on a common DRX pattern may be assumed to be a UE that is always in an ON state as a device that does not require low power consumption, and a RX UE may be assumed to be a UE that is connected to the TX UE and requires low power transmission/reception.

Figure 24:
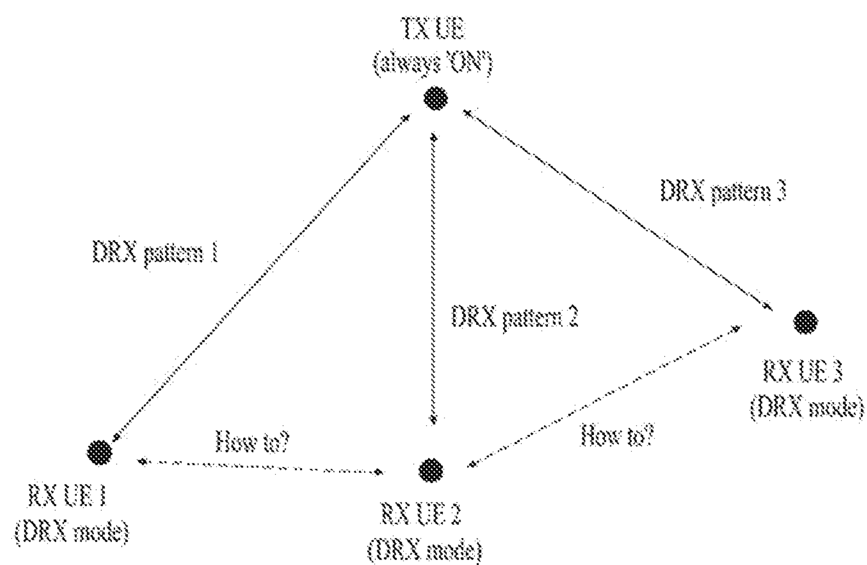
FIG. 24 is a diagram for explaining an anchor UE-based DRX operation according to an embodiment of the present disclosure.

FIG. 24 is a diagram for explaining an anchor UE-based DRX operation according to an embodiment of the present disclosure.

Referring to FIG. 24, a RX UE may operate in a DRX mode for a low-power transmission/reception operation, and in this case, DRX patterns used by respective RX UEs may be determined in cooperation with a TX UE. When the DRX pattern is determined, if the TX UE has data to be transmitted to the RX UE, the TX UE may transmit the data to the RX UE during an ON duration to mutual connection therebetween, and the TX UE may always be in an ON state, and accordingly, when the RX UE has data to be transmitted to the TX UE, the RX UE may wake up immediately and may transmit the data to the TX UE.

However, assuming that the TX UE functions as an anchor UE and various RX UEs that are connected thereto and operate in a DRX mode are present, there may be the following problem in communication between RX UEs operating in the DRX mode. For example, RX UEs operating in different DRX mode may not know the DRX patterns used with each other, and thus there may be a need for a method to know about each other's presence, and there may also be a need for a method for communication between the RX UEs.

Hereinafter, the present disclosure will describe various examples of a direct communication method between RX UEs that are connected to a TX UE and operate in a DRX mode when the TX UE functions as an anchor UE. When multiple activated BWPs are present, if communication is performed using different DRX modes in the respective BWPs, the case in which extension thereof is applied will also be considered and described.

In order to recognize each other between RX UEs operating in a DRX mode and to start communication, each other's DRX pattern (a period, an On duration, a start offset time, etc.) may be required.

Method 2-1

In Method 2-1 according to the present disclosure, a TX UE that acts as an anchor UE may inform each RX UE operating in DRX mode of information on DRX patterns of other neighboring RX UEs periodically or upon request. In this case, the TX UE may act as a relay.

Figure 25:
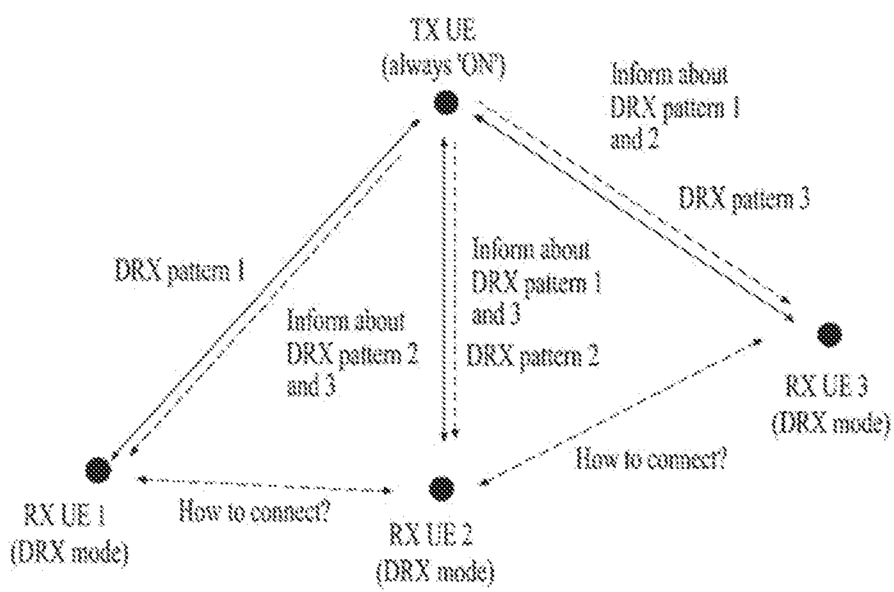
FIG. 25 is a diagram for explaining a DRX pattern transmission method according to an embodiment of the present disclosure.

FIG. 25 is a diagram for explaining a DRX pattern transmission method according to an embodiment of the present disclosure.

Referring to FIG. 25, a TX UE may inform each RX UE of information on an ID and a DRX pattern of a neighboring RX UE. The RX UE that receives the information on the ID and the DRX pattern of the neighboring RX UE may attempt connection with another RX UE that wants communication according to the corresponding DRX pattern.

Alternatively, the TX UE may perform an operation in which the RX UE that informs union information of a DRX pattern of a neighboring RX UE and receives the union information of the DRX pattern starts communication such as transmission of a discovery message of the RX UE to a corresponding pattern. Here, the union information of the DRX pattern may be a DRX pattern including all ON durations included in DRX patterns of neighboring RX UEs.

According to the aforementioned method 2-1, there may be a need for a process in which a UE wakes up according to DRX patterns of other RX UEs and checks whether a RX UE is suitable for communication in order to search for the RX UE suitable for communication in consideration of the type or quality of a service. In this case, an ON state needs to be maintained according to the DRX patterns of different respective RX UEs, and thus power consumption may increase as the DRX patterns of the respective RX UEs are different.

Method 2-2

In Method 2-2 according to the present disclosure, each RX UE may periodically transmit a discovery message, and in this case, may also transmit a DRX pattern thereof. A UE that wants communication may be maintained in a wakeup state for a predetermined time to receive a discovery message of neighboring UEs, and may search for a UE as a communication target using information on the DRX pattern present in the discovery message and may transmit data according to the DRX pattern of the corresponding UE to perform communication.

According to Method 2-2, in order to know presence of another UE that newly enters a communication range, a UE needs to periodically wake up and to be maintained in a wakeup state for a predetermined time, and thus this may be a disadvantage for a low power operation.

Method 2-3

In Method 2-3 according to the present disclosure, a TX UE that acts as an anchor UE may generate a common DRX pattern in a DRX pattern of a neighboring RX UE, and RX UEs may recognize each other's presence using the common DRX pattern. A detailed method of generating a "COMMON DRX PATTERN" by the TX UE may be performed by the following Step-1 to Step-5. In this case, it may be assumed that each RX UE broadcasts a discovery message at least once during a predetermined time unit.

FIGS. 26 to 30 are diagrams for explaining a common DRX pattern method according to an embodiment of the present disclosure.

Figure 26:
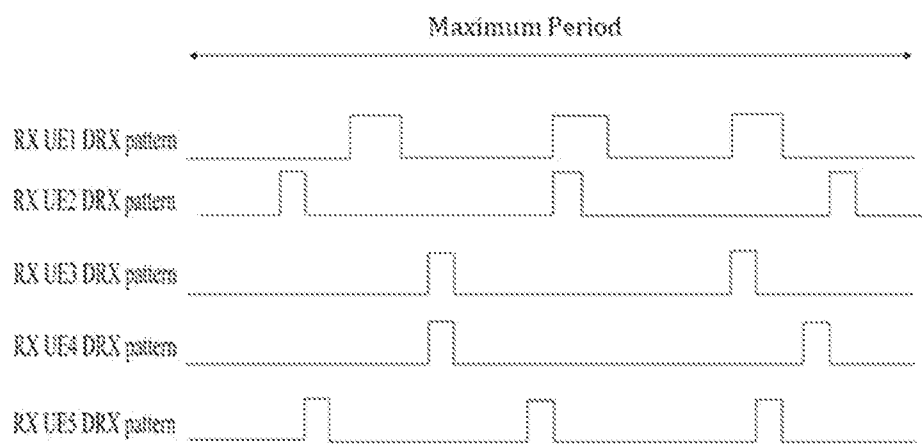
FIGS. 26 to 30 are diagrams for explaining a common DRX pattern method according to an embodiment of the present disclosure.

Referring to FIG. 26, in Step-1, a TX UE may generate a "RX UE PATTERN POOL" in a predetermined time unit (e.g., "the maximum period"). All RX UE IDs and DRX patterns that are checked through a discovery message of RX UEs by the TX UE for a predetermined time may be stored in an initial "RX UE PATTERN POOL". That is, the "RX UE PATTERN POOL" may include information of the DRX patterns of the respective RX UEs.

Figure 27:
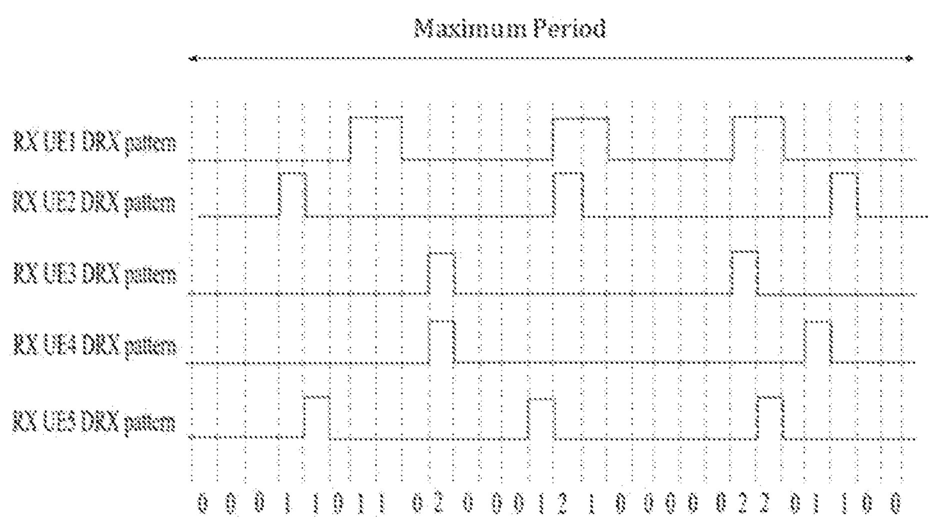

Referring to FIG. 27, in Step-2, the TX UE may check the number of overlapping ON durations in slot/subframes units among DRX patterns for a predetermined time unit. For example, the TX UE may check whether the ON durations overlap for each slot/subframe unit in the generated "RX UE PATTERN POOL", and when the ON durations overlap each other, the TX UE may count the number of overlapping.

Figures 28, 29:
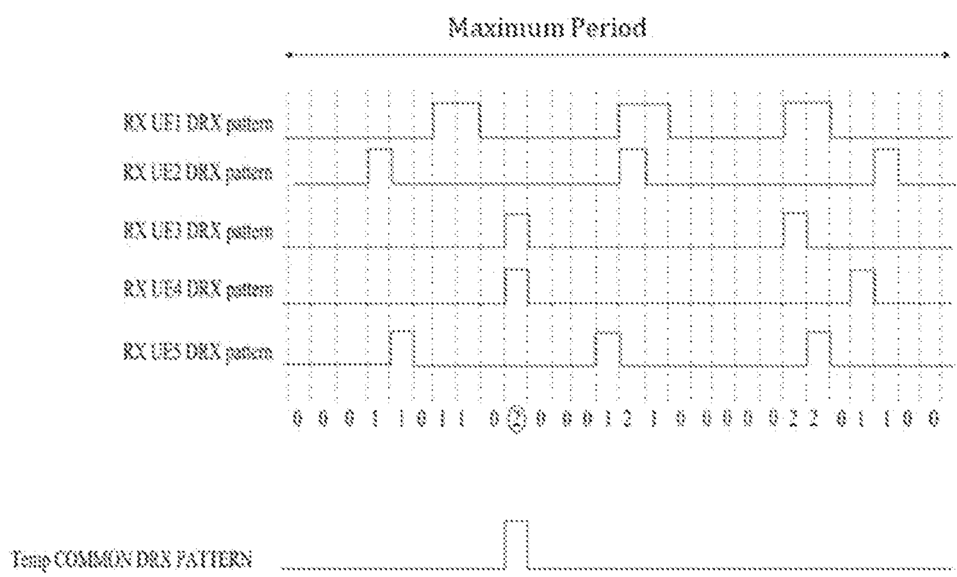

Referring to FIG. 28, in Step-3, the TX UE may extract a location in which the ON durations overlap the most and may generate a temporary "temp COMMON DRX PATTERN" using an AND value of signals of the extracted location. In other words, the TX UE may extract only an ON duration corresponding to the highest number of overlapping among the numbers of the ON durations counted in Step-2 and may generate the "temp COMMON DRX PATTERN" that is a new DRX pattern.

In this case, when there is a plurality of parts in which ON durations overlap the most, the TX UE may use only a first detected part. For example, in the case of FIG. SY5, the count with the largest number of overlapping ON durations may be 2, and among the slots/subframes included in the maximum period and corresponding to count 2, only the ON duration corresponding to the slot/subframe located first in the time domain may be extracted.

The TX UE may remove a RX UE in which an ON duration included in the "temp COMMON DRX PATTERN" is present from the "RX UE PATTERN POOL". That is, the TX UE may remove a DRX pattern including the ON duration included in the "temp COMMON DRX PATTERN" from the "RX UE PATTERN POOL".

Referring to FIG. 29, in Step-4, the TX UE may perform Step-3 on the DRX pattern of the RX UE present in the remaining "RX UE PATTERN POOL" and may calculate an OR operation with the previously extracted "temp COMMON DRX PATTERN" pattern to generate the new "temp COMMON DRX PATTERN".

In detail, the TX UE may perform Step-3 on the "RX UE PATTERN POOL" including the remaining DRX pattern except for the DRX pattern removed in Step-3 to generate the "temp COMMON DRX PATTERN" pattern and may combine the "temp COMMON DRX PATTERN" pattern with the previously generated "temp COMMON DRX PATTERN" pattern to generate the new "temp COMMON DRX PATTERN" pattern.

Then, the TX UE may repeatedly perform Step-2 to Step-3 until there is no RX UE present in the "RX UE PATTERN POOL". In other words, the TX UE may repeatedly perform Step-2 to Step-3 until there is no DRX pattern present in the "RX UE PATTERN POOL".

Figure 30:
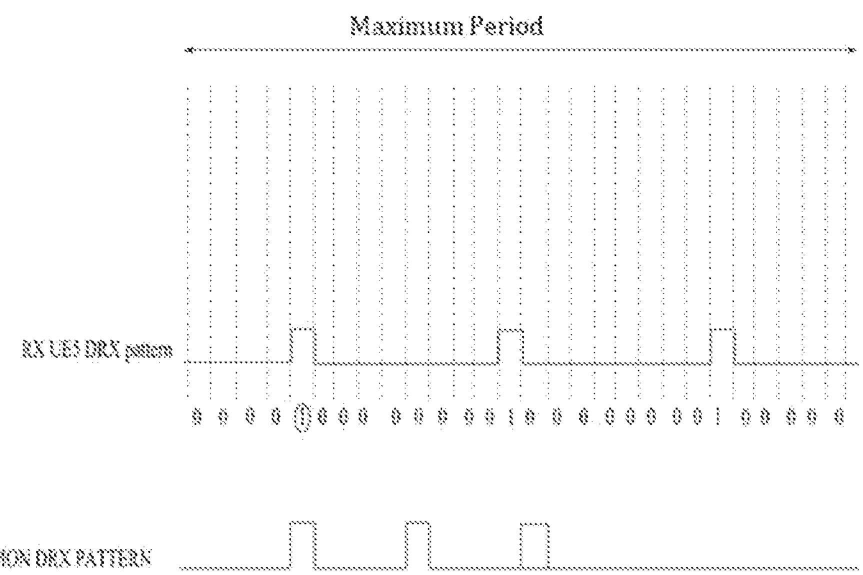

The TX UE may generate the "COMMON DRX PATTERN" shown in FIG. 30 through Step-4. The "COMMON DRX PATTERN" may be a common pattern in which all RX UEs connected to the corresponding N-BWP are capable of communicating based on the TX UE.

In Step-5, the TX UE may perform Step-1 to Step-4 for each N-BWP when an M-BWP is present.

According to the present disclosure, a UE may perform various operations based on the "COMMON DRX PATTERN"

For example, the amount of information that needs to be transmitted by the TX UE may be limited to the COMMON DRX PATTERN. That is, the TX UE may transmit a signal to RX UEs only in an ON duration included in the COMMON DRX PATTERN. In addition, in order for RX UEs operating in a DRX mode to detect a RX UE operating in a DRX mode of a different pattern, a time in which the UE needs to wake up may be limited to the COMMON DRX PATTERN. Thus, the RX UE may operate with low power.

For example, the TX UE may periodically broadcast the "COMMON DRX PATTERN", and the RX UE that receives the same may transmit a discovery message in a duration corresponding to the ON duration in the COMMON DRX PATTERN. Thus, the probability of establishing connection between the RX UE and a RX UE performing another DRX operation may be increased.

For example, the RX UE operating in a DRX mode may request the "COMMON DRX PATTERN" to the TX UE for direct communication with the UE operating in a DRX mode of another pattern. The TX UE may transmit a discovery message according to the requested "COMMON DRX PATTERN". The other RX UE that receives the discovery message including the "COMMON DRX PATTERN" may start connection.

For example, the "COMMON DRX PATTERN" may be a pool dedicated to the discovery message. Alternatively, a resource may be selected by applying different references (e.g., a threshold) when the resource is selected by applying a higher priority to the discovery message than a data message at a location corresponding to the "COMMON DRX PATTERN".

For example, when a plurality of TX UEs are present and broadcasts the "COMMON DRX PATTERN", if a discovery message is transmitted in a time duration corresponding to "OR" of the "COMMON DRX PATTERN"s, there may be a high possibility of finding a neighboring RX UE operating in a DRX mode.

Although the present disclosure has described above that the TX UE recognize a DRX pattern of a neighboring RX UE to generate the "COMMON DRX PATTERN", a specific RX UE may recognize the DRX pattern of the neighboring RX UE from the TX UE to autonomously generate the "COMMON DRX PATTERN". That is, the neighboring RX UE for enabling direct connection may also be easily found by attempting connection (e.g., by transmitting a discovery message) in the COMMON DRX PATTERN that is autonomously recognized by the RX UE.

According to the present disclosure, it may be assumed that the "maximum period" may be differently (pre)configured for each N-BW in an environment in which an M-BWP is activated and used. In this case, even if the UE that uses a specific N-BWP operates in a DRX mode, the UE may be in an "ON state" at least once during the "maximum period".

Alternatively, when the TX UE transmits a discovery message in a corresponding N-BWP in an environment in which an M-BWP is activated and used, the "COMMON DRX PATTERN" of the corresponding N-BWP and another N-BWP may also be broadcast.

Alternatively, in an environment in which an M-BWP is activated and used, the RX UE may request the "COMMON DRX PATTERN" of another N-BWP other than the "COMMON DRX PATTERN" corresponding to the N-BWP of the RX UE, to the TX UE.

According to the present disclosure above, when a plurality of RX UEs operating in a DRX mode are connected to each other for a low-power operation using a specific TX UE, which does not require low-power transmission, as an anchor UE, direct communication between the RX UEs may be possible. In particular, a DRX pattern of a RX UE corresponding a communication range of the TX UE based on the TX UE may be recognized to generate a common DRX pattern, and direct communication between RX UEs operating in a DRX mode of another neighboring pattern may be attempted using the generated common DRX pattern, which may also be applied to an M-BWP environment.

Figure 31:
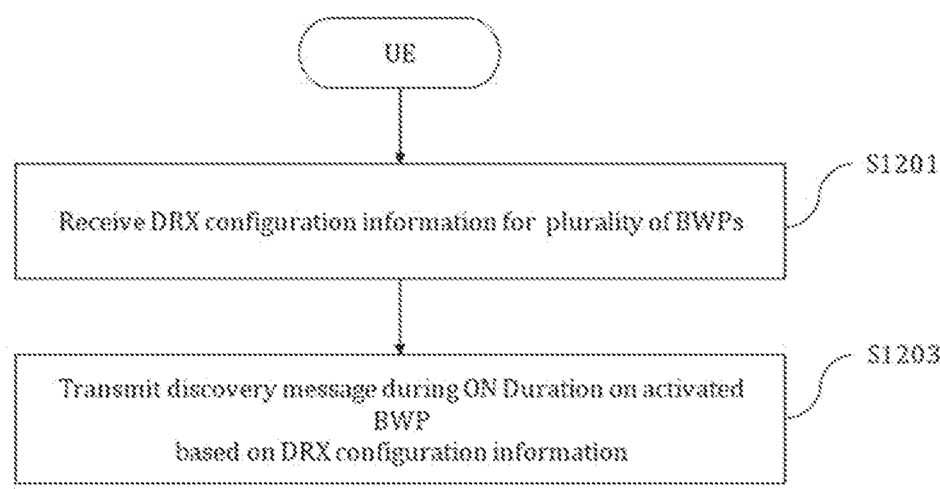
FIG. 31 is a flowchart of a sidelink signal transmission method according to an embodiment of the present disclosure.

FIG. 31 is a flowchart of a sidelink signal transmission method according to an embodiment of the present disclosure.

Referring to FIG. 31, in S1201, a UE may receive discontinuous reception (DRX) configuration information for each of a plurality of bandwidth parts (BWPs). Here, the DRX configuration information may include a first ON duration related to a DRX operation, a DRX period related to the DRX operation, and an offset in which the first ON duration in the DRX period starts.

In this case, the DRX configuration information may be configured for each of the plurality of BWPs. A service to be used for each of the BWPs may be (pre)configured, and thus the DRX configuration information may be differently configured for respective services.

In S1203, the UE may transmit a discovery signal during the first ON duration on an activated BWP among the plurality of BWPs based on the DRX configuration information.

Here, the sidelink signal transmission method may further include transmitting a sidelink signal on a common on-duration that is commonly configured in the plurality of BWPs. In this case, the sidelink signal may include the DRX configuration information.

The common on-duration may be configured based on a system frame number (SFN).

Alternatively, the sidelink signal transmission method may further include receiving DRX configuration information of at least one another UE on the common on-duration and configuring a DRX pattern based on DRX configuration information of the at least one another UE.

The DRX pattern may include a plurality of ON durations. In this case, the plurality of ON durations may include only an ON duration in which the first ON duration and the second ON duration included in the DRX configuration information of the at least one another UE overlap the most.

It is obvious that each of the examples of the proposed methods may also be included as one of various embodiments of the present disclosure, and thus each example may be regarded as a kind of proposed method. Although the proposed methods may be implemented independently, some of the proposed methods may be combined (or merged) and implemented. The methods proposed in the present disclosure have been described in the context of the 3GPP NR system for convenience of description, the scope of systems to which the proposed methods are applied may be extended to other systems in addition to the 3GPP NR system. For example, the proposed methods of the present disclosure may be extended and applied to D2D communication. Here, D2D communication refers to direct communication between UEs over a radio channel. Although the UE means a user terminal, a network equipment such as a BS may also be regarded as a kind of UE if the network equipment transmits and receives a signal according to UE-to-UE communication schemes. In addition, the proposed methods of the present disclosure may be limitedly applied to MODE 3 V2X operations (and/or MODE 4 V2X operations). For example, the proposed methods of the present disclosure may be limitedly applied to transmission of a preconfigured (and/or signaled) (specific) V2X channel (and/or signal) (e.g., PSSCH (and/or (related) PSCCH and/or PSBCH)). For example, the proposed methods of the present disclosure may be limitedly applied when a PSSCH and a PSCCH (related thereto) are transmitted such that they are located to be adjacent (and/or non-adjacent) (in the frequency domain) (and/or when transmission is performed based on the value (and/or range) of a preconfigured (and/or signaled) MCS (coding rate and/or RB). For example, the proposed methods of the present disclosure may be limitedly applied to MODE 3 (and/or MODE 4) V2X carriers (MODE 4 (and/or 3) SL (and/or UL) SPS carriers and/or MODE 4 (and/or 3) dynamic scheduling carriers). Moreover, the proposed methods of the present disclosure may be (limitedly) applied when the positions and/or number of synchronization signal (transmission (and/or reception)) resources (and/or the positions and/or number of subframes in a V2X resource pool (and/or the size and number of sub-channels)) are the same (and/or (partially) different) between carriers. For example, the proposed methods of the present disclosure may be extended and applied to (V2X) communication between a BS and a UE. For example, the proposed methods of the present disclosure may be limitedly applied to unicast (SL) communication (and/or multicast (or groupcast) (SL) communication and/or broadcast (SL) communication).

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 32:
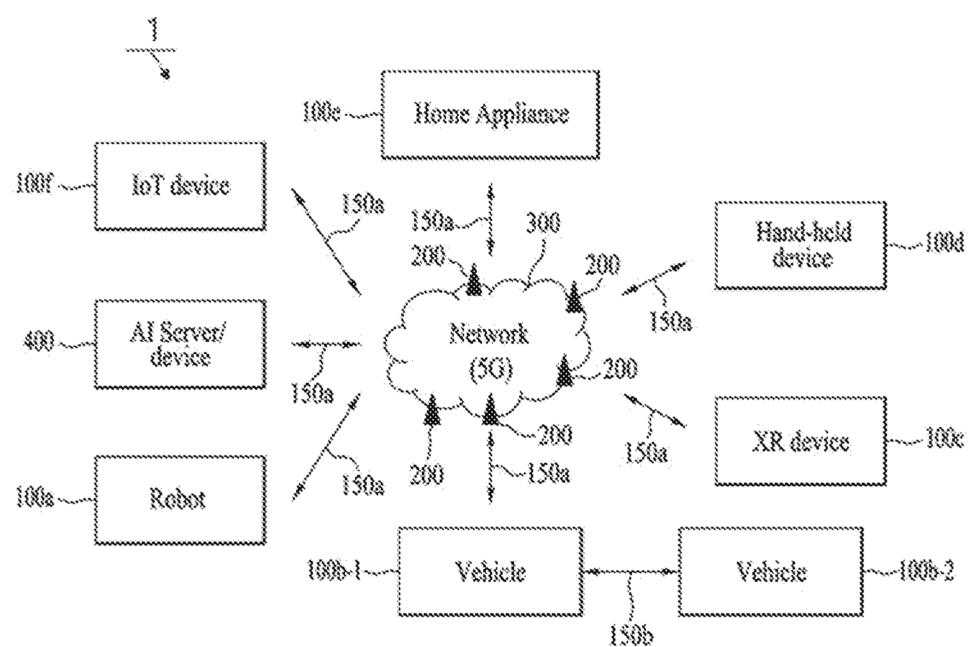
FIGS. 32 to 38 are block diagrams illustrating various devices applicable to embodiment(s) of the present disclosure.

FIG. 32 illustrates a communication system 1 applied to the present disclosure.

Referring to FIG. 32, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 33:
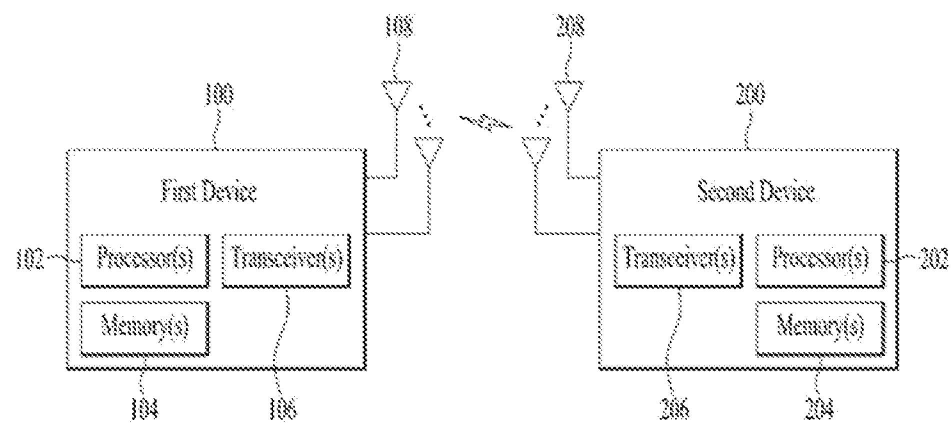

FIG. 33 illustrates wireless devices applicable to the present disclosure.

Referring to FIG. 33, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 32.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Here, a wireless communication technology implemented in the wireless devices 100 and 200 in the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in the wireless devices 100 and 200 may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices 100 and 200 according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) associated with small/low-power digital communication based on various standards such as IEEE 802.15.4 and may be called various terms.

Figure 34:
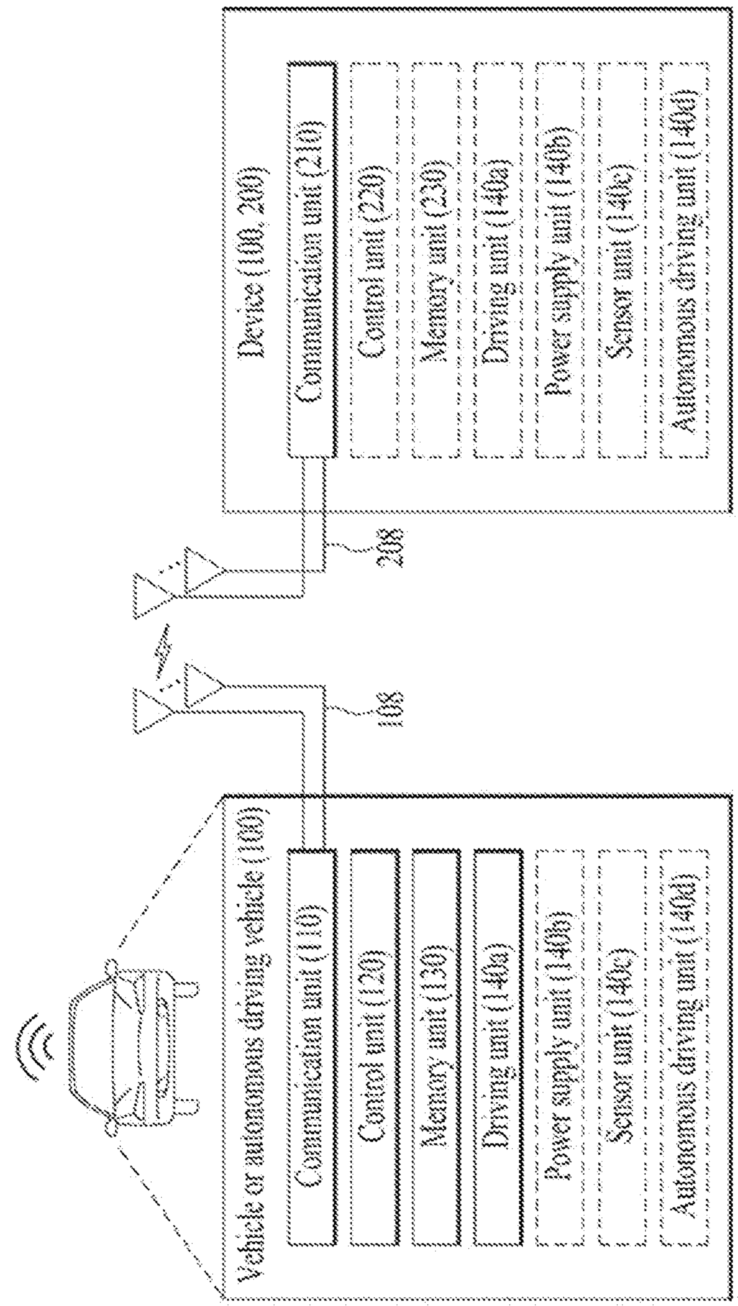

Example of a Vehicle or an Autonomous Driving Vehicle to which the Present Disclosure is Applied FIG. 34 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 34, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit **140*d*** may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit **140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110** may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 35:
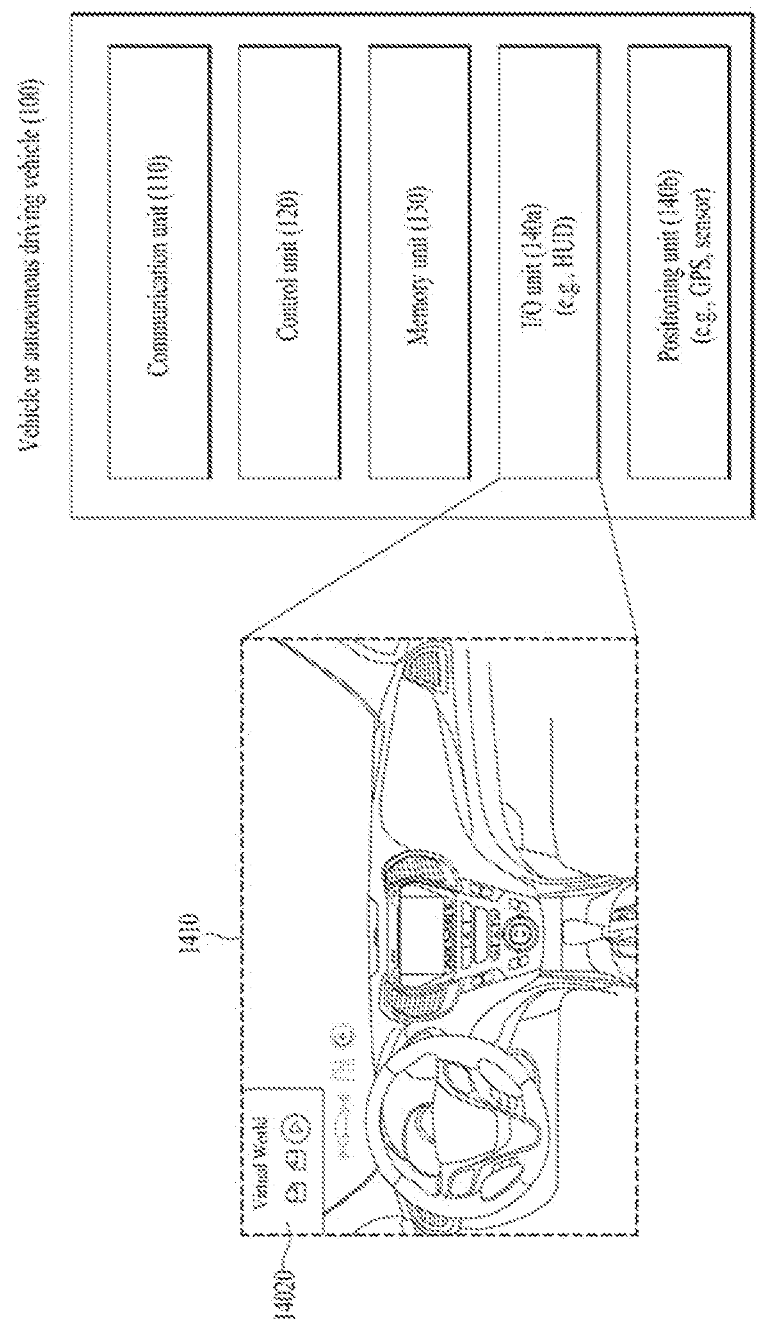

FIG. 35 illustrates a vehicle applied to the present disclosure. The vehicle may be implemented as a transport means, an aerial vehicle, a ship, etc.

Referring to FIG. 35, a vehicle 100 may include a communication unit 110, a control unit 120, a memory unit 130, an I/O unit **140*a*, and a positioning unit 140*b***.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit **140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b*** may include a GPS and various sensors.

As an example, the communication unit 110 of the vehicle 100 may receive map information and traffic information from an external server and store the received information in the memory unit 130. The positioning unit **140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120** may transmit the vehicle position information and the information about driving/vehicle abnormality to related organizations.

Examples of XR Device to which the Present Disclosure is Applied

Figure 36:
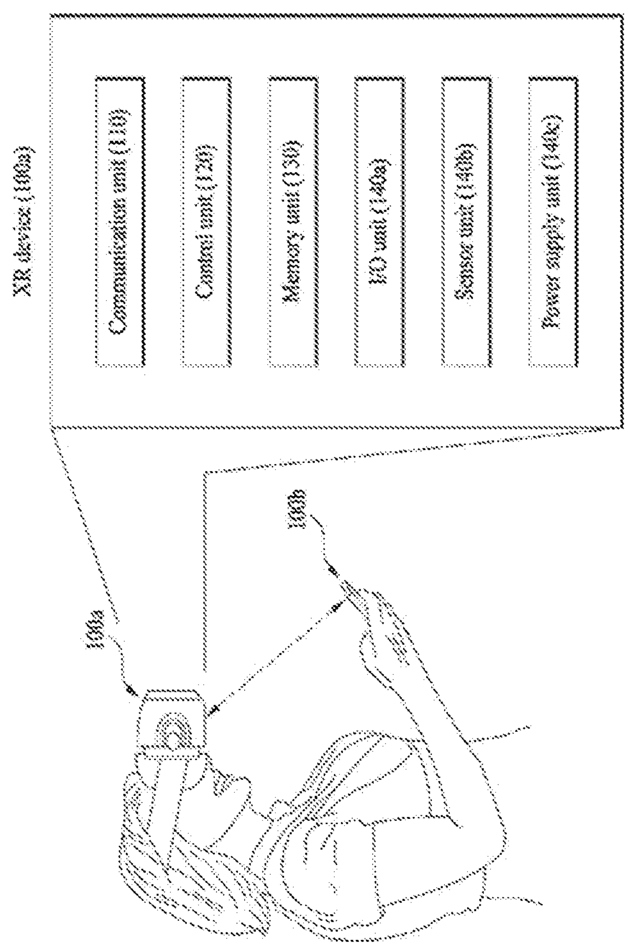

FIG. 36 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 36, an XR device **100*a* may include a communication unit 110, a control unit 120, a memory unit 130, an I/O unit 140*a*, a sensor unit 140*b*, and a power supply unit 140*c***.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device **100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a*** and include a wired/wireless charging circuit, a battery, etc.

For example, the memory unit 130 of the XR device **100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b***.

The XR device 100$a$ may be wirelessly connected to the hand-held device 100$b$ through the communication unit 110 and the operation of the XR device 100$a$ may be controlled by the hand-held device 100$b$. For example, the hand-held device 100$b$ may operate as a controller of the XR device 100$a$. To this end, the XR device 100$a$ may obtain information about a 3D position of the hand-held device 100$b$ and generate and output an XR object corresponding to the hand-held device 100$b$.

Examples of Robot to which the Present Disclosure is Applied

Figure 37:
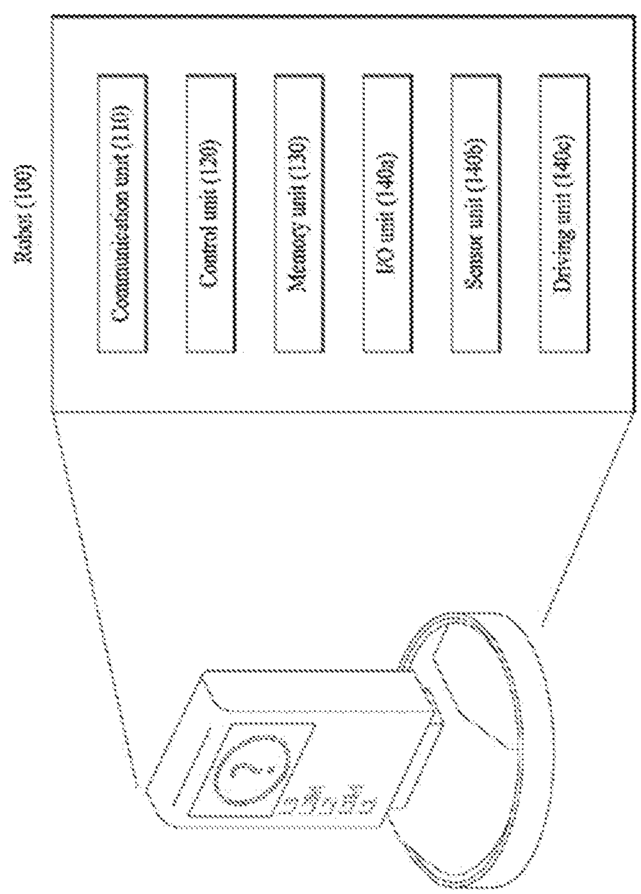

FIG. 37 illustrates a robot applied to the present disclosure. The robot may be categorized into an industrial robot, a medical robot, a household robot, a military robot, etc., according to a used purpose or field.

Referring to FIG. 37, a robot 100 may include a communication unit 110, a control unit 120, a memory unit 130, an I/O unit 140$a$, a sensor unit 140$b$, and a driving unit 140$c$.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140$a$ may obtain information from the exterior of the robot 100 and output information to the exterior of the robot 100. The I/O unit 140$a$ may include a camera, a microphone, a user input unit, a display unit, a speaker, and/or a haptic module. The sensor unit 140$b$ may obtain internal information of the robot 100, surrounding environment information, user information, etc. The sensor unit 140$b$ may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140$c$ may perform various physical operations such as movement of robot joints. In addition, the driving unit 140$c$ may cause the robot 100 to travel on the road or to fly. The driving unit 140$c$ may include an actuator, a motor, a wheel, a brake, a propeller, etc.

Examples of AI Device to which the Present Disclosure is Applied

Figure 38:
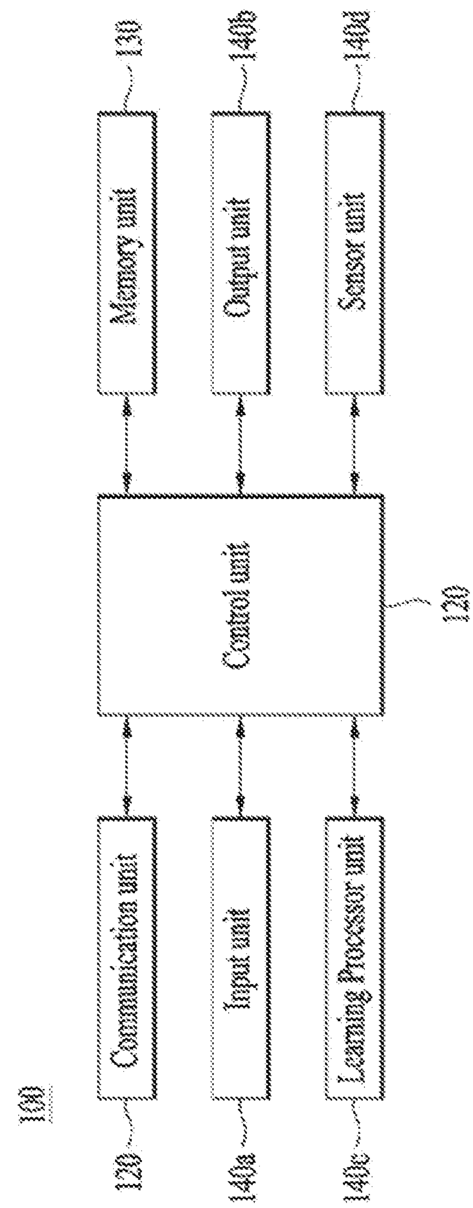

FIG. 38 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 38, an AI device 100 may include a communication unit 110, a control unit 120, a memory unit 130, an I/O unit 140$a$/140$b$, a learning processor unit 140$c$, and a sensor unit 140$d$.

The communication unit 110 may transmit and receive wired/radio signals (e.g., sensor information, user input, learning models, or control signals) to and from external devices such as other AI devices (e.g., 100$x$, 200, or 400 of FIG. 32) or an AI server (e.g., 400 of FIG. 32) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140$c$ or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140$c$ or transmit the collected information to an external device such as an AI server (400 of FIG. 32). The collected history information may be used to update a learning model.

The memory unit 130 may store data for supporting various functions of the AI device 100. For example, the memory unit 130 may store data obtained from the input unit 140$a$, data obtained from the communication unit 110, output data of the learning processor unit 140$c$, and data obtained from the sensor unit 140. The memory unit 130 may store control information and/or software code needed to operate/drive the control unit 120.

The input unit 140$a$ may acquire various types of data from the exterior of the AI device 100. For example, the input unit 140$a$ may acquire learning data for model learning, and input data to which the learning model is to be applied. The input unit 140$a$ may include a camera, a microphone, and/or a user input unit. The output unit 140$b$ may generate output related to a visual, auditory, or tactile sense. The output unit 140$b$ may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140$c$ may learn a model consisting of artificial neural networks, using learning data. The learning processor unit 140$c$ may perform AI processing together with the learning processor unit of the AI server (400 of FIG. 32). The learning processor unit 140$c$ may process information received from an external device through the communication unit 110 and/or information stored in the memory unit 130. In addition, an output value of the learning processor unit 140$c$ may be transmitted to the external device through the communication unit 110 and may be stored in the memory unit 130.

INDUSTRIAL AVAILABILITY

The above-described embodiments of the present disclosure are applicable to various mobile communication systems.

What is claimed is:

1. A method of a user equipment (UE) in a wireless communication system for supporting sidelink channel, the method comprising:

receiving information on an available DRX pattern from each of other UEs through the sidelink channel;

generating available discontinuous reception (DRX) configuration information for a low power operation;

transmitting the generated DRX configuration information to each of the other UEs through the sidelink channel; and transmitting a signal through the sidelink channel according to the generated DRX configuration information, wherein the available DRX pattern is determined based on a length of an ON duration and a period of the ON duration, and wherein the length of the ON duration and the period of the ON duration related to the available DRX configuration information are selected based on the available DRX pattern related to the each of the other UEs.

2. The method of claim 1, wherein the UE that generates the DRX configuration information is a transmission user equipment (TX UE) as a subject that transmits the signal based on data generating.

3. The method of claim 1, wherein the available DRX configuration information includes information on at least one DRX pattern determined based on at least one of a priority for each service, an available power state, or radio frequency (RF) capability.

4. The method of claim 1, wherein the available DRX pattern is determined further based on a start offset of the ON duration.

5. The method of claim 1, wherein a DRX pattern related to the available DRX configuration information is selected to match the ON duration of the available DRX pattern in the UE and the ON duration of the available DRX pattern in the each of the other UEs as much as possible, and the signal is transmitted according to the selected DRX pattern.

6. The method of claim 1, wherein the generated DRX configuration information is transmitted through any one of a discovery channel, a control channel, and a data channel.

7. The method of claim 1, wherein the available DRX configuration information includes DRX configuration information for each bandwidth part (BWP) of at least one currently activated BWP among a plurality of preconfigured BWPs.

8. An apparatus for a user equipment (UE) for performing communication through sidelink channel in a wireless communication system, the apparatus comprising:

at least one processor; and at least one memory operatively connected to the at least one processor and configured to store at least one instruction for causing the at least one processor to perform operations, the operations including:

receiving information on an available DRX pattern related to each of other UEs from the other UEs through the sidelink channel;

generating available discontinuous reception (DRX) configuration information for a low power operation;

transmitting the generated DRX configuration information to the other UEs through the sidelink channel; and transmitting a signal through the sidelink channel according to the generated DRX configuration information, wherein the available DRX pattern is determined based on a length of an ON duration and a period of the ON duration, and wherein the length of the ON duration and the period of the ON duration related to the available DRX configuration information are selected based on the available DRX pattern related to the each of the other UEs.

9. The apparatus of claim 8, wherein the available DRX configuration information includes information on at least one DRX pattern determined based on at least one of a priority for each service, an available power state, or radio frequency (RF) capability.

10. The apparatus of claim 8, wherein the available DRX pattern is determined further based on a start offset of the ON duration.

11. The apparatus of claim 8, wherein the processor selects a DRX pattern related to the available DRX configuration information to match the ON duration of the available DRX pattern in the UE and the ON duration of the available DRX pattern in the each of the other UEs as much as possible and transmits the signal according to the selected DRX pattern.

12. The apparatus of claim 8, wherein the generated DRX configuration information is transmitted through any one of a discovery channel, a control channel, and a data channel.

13. The apparatus of claim 8, wherein the available DRX configuration information includes DRX configuration information for each bandwidth part (BWP) of at least one currently activated BWP among a plurality of preconfigured BWPs.

14. The apparatus of claim 8, wherein at least one of the UE or the each of the other UEs is an autonomous driving vehicle or is included in the autonomous driving vehicle.

* * * * *